United States Patent
Li et al.

(10) Patent No.: US 10,454,381 B2
(45) Date of Patent: Oct. 22, 2019

(54) VARIABLE DC LINK CONVERTER AND TRANSFORMER FOR WIDE OUTPUT VOLTAGE RANGE APPLICATIONS

(71) Applicant: Virginia Tech Intellectual Properties, Inc., Blacksburg, VA (US)

(72) Inventors: Bin Li, Blacksburg, VA (US);
Zhengyang Liu, Blacksburg, VA (US);
Fred C. Lee, Blacksburg, VA (US);
Qiang Li, Blacksburg, VA (US)

( * ) Notice: Subject to any disclaimer, the term of this patent is extended or adjusted under 35 U.S.C. 154(b) by 205 days.

(21) Appl. No.: 15/693,930

(22) Filed: Sep. 1, 2017

(65) Prior Publication Data

US 2018/0076723 A1  Mar. 15, 2018

Related U.S. Application Data

(60) Provisional application No. 62/395,134, filed on Sep. 15, 2016.

(51) Int. Cl.
*H02J 7/00* (2006.01)
*H02M 3/335* (2006.01)
(Continued)

(52) U.S. Cl.
CPC ........ *H02M 3/33569* (2013.01); *H01F 27/24* (2013.01); *H01F 27/28* (2013.01);
(Continued)

(58) Field of Classification Search
CPC ................................................ H02M 3/33569
(Continued)

(56) References Cited

U.S. PATENT DOCUMENTS 5,659,237 A * 8/1997 Divan .................. H02J 7/0018
320/119
6,314,007 B2 * 11/2001 Johnson, Jr. ........... H02J 9/061
307/66
(Continued)

OTHER PUBLICATIONS

Deng, J.; et, al., "Design Methodology of LLC Resonant Converters for Electric Vehicle Battery Chargers". IEEE Transactions on Vehicular Technology, vol. 63, No. 4 (May 2014) pp. 1581-1592.
(Continued)

*Primary Examiner* — Yalkew Fantu
(74) *Attorney, Agent, or Firm* — Thomas | Horstemeyer, LLP; John S. Sears; Jason M. Perilla

(57) ABSTRACT

A variable direct current (DC) link power converter is described. In one example, the power converter includes a first converter stage configured to convert power from a power source to power at an intermediate link voltage and a second converter stage configured to convert the power at the intermediate link voltage to power for charging a battery. The power converter further includes a control system having an intermediate link voltage regulation control loop configured, in a first mode of operation, to regulate the intermediate link voltage through the first converter stage based on a voltage of the battery, and a ripple regulation control loop configured to sense a charging current for the battery and regulate a gain of the second converter stage based on the charging current to reduce ripple in the charging current. A new configuration of transformer suitable for use with the power converter is also described.

19 Claims, 21 Drawing Sheets

(51) Int. Cl.
| | |
|---|---|
| H02M 1/088 | (2006.01) |
| H02M 1/42 | (2007.01) |
| H02J 7/04 | (2006.01) |
| H02M 1/14 | (2006.01) |
| H01F 27/24 | (2006.01) |
| H01F 27/28 | (2006.01) |
| H02M 3/337 | (2006.01) |
| H02J 7/02 | (2016.01) |
| H01F 27/34 | (2006.01) |
| H02M 1/00 | (2006.01) |

(52) U.S. Cl.
 CPC ............ *H02J 7/0063* (2013.01); *H02J 7/022* (2013.01); *H02J 7/04* (2013.01); *H02M 1/088* (2013.01); *H02M 1/14* (2013.01); *H02M 1/4208* (2013.01); *H02M 3/3378* (2013.01); *H01F 27/346* (2013.01); *H01F 2027/2819* (2013.01); *H02J 2007/0067* (2013.01); *H02M 2001/007* (2013.01); *H02M 2001/0048* (2013.01); *Y02B 40/90* (2013.01); *Y02B 70/126* (2013.01); *Y02B 70/1491* (2013.01)

(58) Field of Classification Search
 USPC ........................................................ 320/128
 See application file for complete search history.

(56) References Cited

U.S. PATENT DOCUMENTS

| | | | | |
|---|---|---|---|---|
| 7,245,508 | B2* | 7/2007 | Tokuda | H02M 5/4585 363/132 |
| 8,575,778 | B2* | 11/2013 | Chen | B60L 53/24 307/66 |
| 8,664,926 | B2* | 3/2014 | Nakatomi | H02M 3/158 323/268 |
| 2006/0139977 | A1* | 6/2006 | Oicles | H02M 3/3376 363/71 |

OTHER PUBLICATIONS

Wang, X.; et, al., "Power-Loss Analysis and Efficiency Maximization of a Silicon-Carbide MOSFET-Based Three-Phase 10-kW Bidirectional EV Charger Using Variable-DC-Bus Control" IEEE Journal of Emerging and Selected Topics in Power Electronics, vol. 4, No. 3 (Sep. 2016) pp. 880-892.

Mu, M.; et, al., "Design Integrated Transformer and Inductor for High Frequency Dual Active Bridge GaN Charger for PHEV". IEEE, Applied Power Electronics Conference and Exposition (May 2015) 6 pages.

Cougo, B.; et, al., "Integration of Leakage Inductance in Tape Wound Core Transformers for Dual Active Bridge Converters". IEEE, Integrated Power Electronics Systems, 7th International Conference on Integrated Power Electronics Systems (May 2012) 6 pages.

Biela, J.; et, al., "Electromagnetic Integration of High Power Resonant Circuits Comprising High Leakage Inductance Transformers" IEEE, Power Electronics Specialists Conference (Nov. 2004) pp. 4537-4545.

Zhang J.; et, al., "Leakage Inductance Calculation for Planar Transformers With a Magnetic Shunt" IEEE Transactions on Industry Applications, vol. 50, No. 6 (Nov. 2014) pp. 4107-4112.

Fu, D.; et, al., "Investigation on Transformer Design of High Frequency High Efficiency DC-DC Converters". IEEE, Applied Power Electronics Conference and Exposition (Mar. 2010) pp. 940-947.

Lai, J.; et, al., "Design Consideration for Power Factor Correction Boost Converter Operating at the Boundary of Continuous Conduction Mode and Discontinuous Conduction Mode". IEEE, Applied Power Electronics Conference and Exposition (Aug. 2002) pp. 267-273.

Kim, J.W.; et, al., "Variable On-time Control of the Critical Conduction Mode Boost Power Factor Correction Converter to Improve Zero-crossing Distortion" IEEE, Power Electronics and Drives Systems (Apr. 2006) pp. 1542-1546.

Amirahmadi, A.; et, al., "Hybrid ZVS BCM Current Controlled Three-Phase Microinverter" IEEE Transactions on Power Electronics, vol. 29, No. 4 (Apr. 2014) pp. 2124-2134.

Amirahmadi, A.; et,a1., "Hybrid Control of BCM Soft-switching Three Phase Micro-inverter" IEEE, Energy Conversion Congress and Exposition (Nov. 2012) pp. 4690-4695.

Zhang, D.; et, al, "High Efficiency Current Mode Control for Three-phase Micro-inverters" IEEE, Applied Power Electronics Conference and Exposition (Mar. 2012) pp. 892-897.

* cited by examiner

VARIABLE DC LINK CONVERTER AND TRANSFORMER FOR WIDE OUTPUT VOLTAGE RANGE APPLICATIONS

CROSS-REFERENCE TO RELATED APPLICATIONS

This application claims the benefit of U.S. Provisional Application No. 62/395,134, filed Sep. 15, 2016, the entire contents of which is hereby incorporated herein by reference.

BACKGROUND

Power conversion is related to the conversion of electric power or energy from one form to another. Power conversion can involve converting between alternating current (AC) and direct current (DC) forms of energy, changing the voltage, current, or frequency of energy, or changing some other aspect of energy from one form to another. In that context, a power converter is an electrical or electro-mechanical device for converting electrical energy. A transformer is one example of a power converter, although more complicated systems, including complex arrangements of switching transistors, transformers, and control loops, can be used.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

One challenge for AC/DC power converters is to accommodate the demands of lightweight, compact, efficient, and low cost systems. It can be difficult because, for some applications, such as power converters used for battery chargers, the output voltage range of such converters needs to be relatively wide. For example, from the fully charged to fully depleted range, a 2:1 ratio or greater can be expected.

Figure 1:
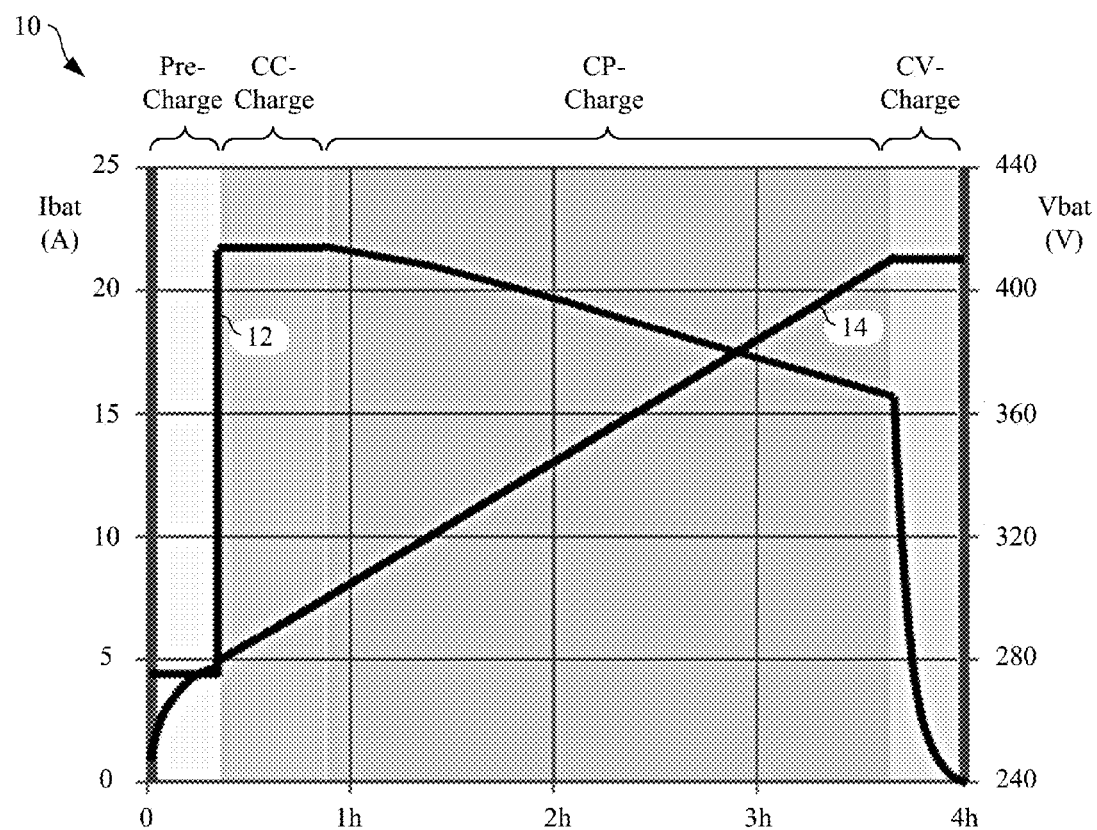
FIG. 1 illustrates an example charging profile for a battery according to various examples described herein.

In that context, FIG. 1 illustrates an example charging profile 10 for charging a battery. The charging profile 10 is illustrated for a lithium-ion battery, but similar charging profiles can be expected for other types of batteries. The charging profile 10 shows four charging stages, including pre-charge, constant current, constant power, and constant voltage stages. The charging profile 10 also shows the battery current 12 and battery voltage 14 of the battery during a four hour charging cycle. The range of the battery voltage 14 is relatively wide during charging, from about 250V to over 400V.

Figure 2:
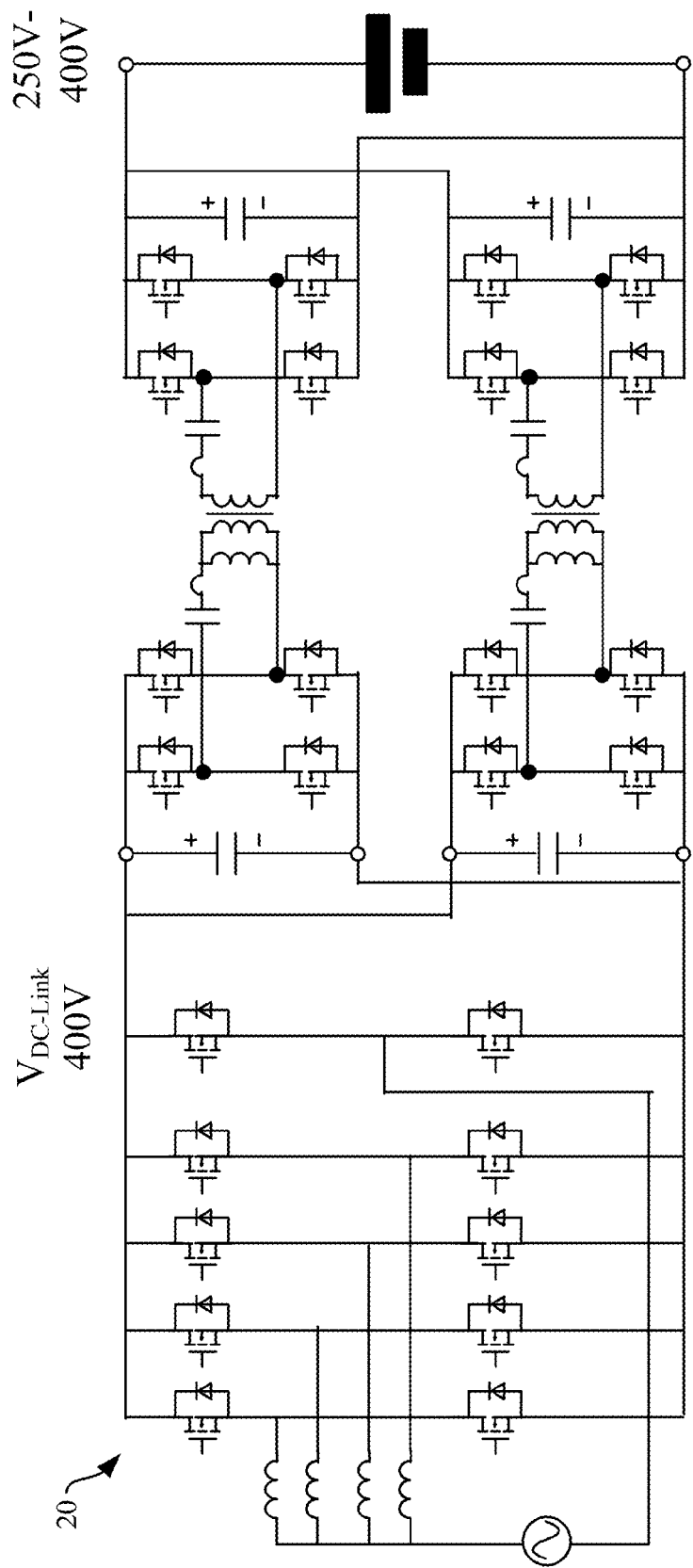
FIG. 2 illustrates a two stage battery charger circuit with a fixed DC link voltage according to various examples described herein.

With conventional two stage battery chargers, the DC-link voltage between the first AC/DC stage and the second DC/DC stage is usually constant. As an example, FIG. 2 illustrates a two stage battery charger circuit 20 with a fixed DC link voltage. The battery charger circuit 20 has a DC-link voltage, $V_{DC\text{-}Link}$, between the first AC/DC stage and the second DC/DC stage of 400V. For the battery charger circuit 20, the voltage for $V_{DC\text{-}Link}$ does not change over time, regardless of the charging stage or battery voltage while charging (see FIG. 1). While charging, the battery voltage can range from 250V-450V, for example, or larger.

Figure 3A:
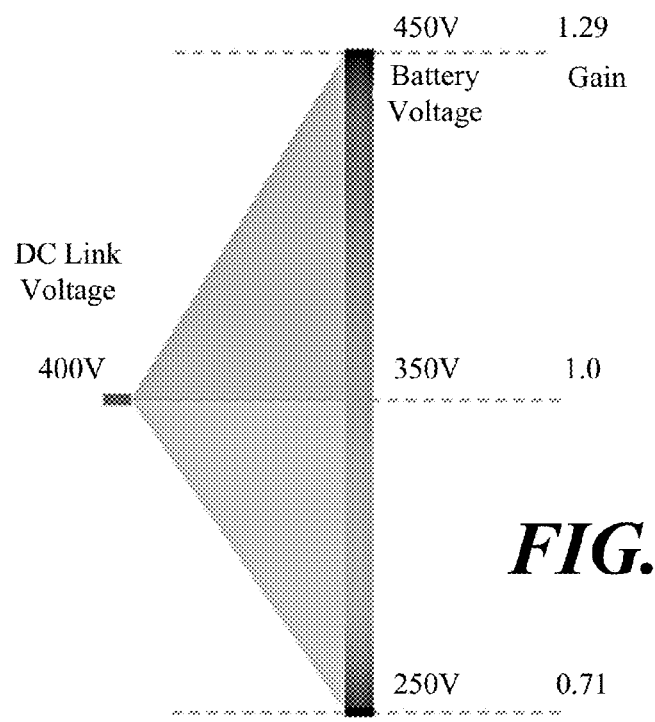
FIG. 3A illustrates an example gain range of a DC/DC stage in the fixed DC link battery charger circuit shown in FIG. 2 according to various examples described herein.
Figure 3B:
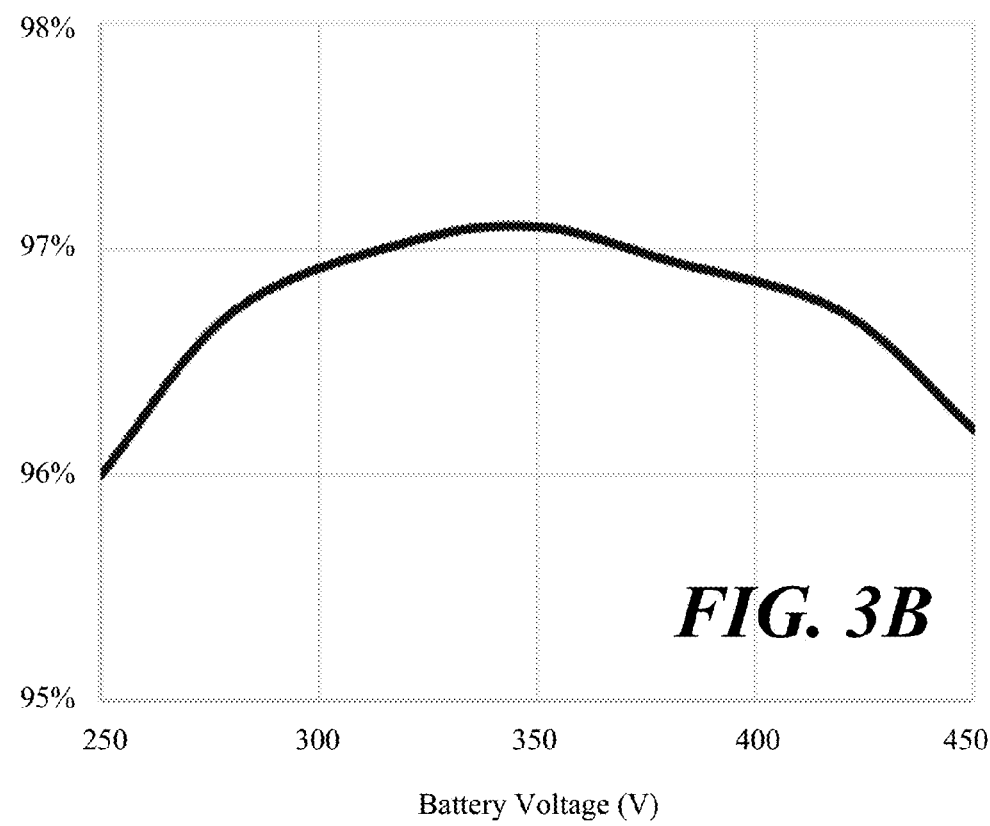
FIG. 3B illustrates an example efficiency curve of for the fixed DC link battery charger circuit structure shown in FIG. 1 according to various examples described herein.

The drawback of battery charger circuit 20 is obvious, as the gain range (Vo/Vin) of the second DC/DC stage is wide. FIG. 3A illustrates an example gain range of the DC/DC stage in the battery charger circuit 20 shown in FIG. 2, and FIG. 3B illustrates an example efficiency curve for the battery charger circuit 20 shown in FIG. 2. As shown, for a constant DC-link voltage of 400V and a battery voltage charging range from about 250V to 450V, the gain range of the DC/DC stage of the battery charger circuit 20 might range from 0.71 to 1.29.

For DC/DC converters, whether it is resonant type (e.g., LLC, CLLC, SRC, etc.), phase shift type (e.g., dual active bridge or phase shift full bridge), or pulse width modulation (PWM) type (e.g., forward or flyback), each has only one point that can achieve the highest efficiency with a fixed design. As the output requirements change, working conditions will drift the converter from its optimized point and efficiency will suffer, as shown in FIG. 3B. Over a 1% efficiency drop (or more depending upon the DC/DC converter design) can be expected when the battery voltage is low and high.

Another challenge for power converters, including battery chargers, is to achieve an integrated magnetic design having light weight, low cost, and good parasitic control. Conventionally, at low frequency operation, transformer windings are usually made of copper or Litz wire. With various winding structures and core shapes, most of the wire based transformers must be assembled by hand, which can be costly and time consuming. Additionally, it can be relatively difficult to achieve good parasitic control with handmade transformers.

With the emergence of wide-band gap semiconductor devices, the switching frequency of converters can be increased by tens of times, providing the opportunity to reduce the number of turns in transformers and even the use of printed circuit board (PCB) windings. Transformers with PCB windings are also called "planar transformers" because they have a relatively low profile.

Figure 4:
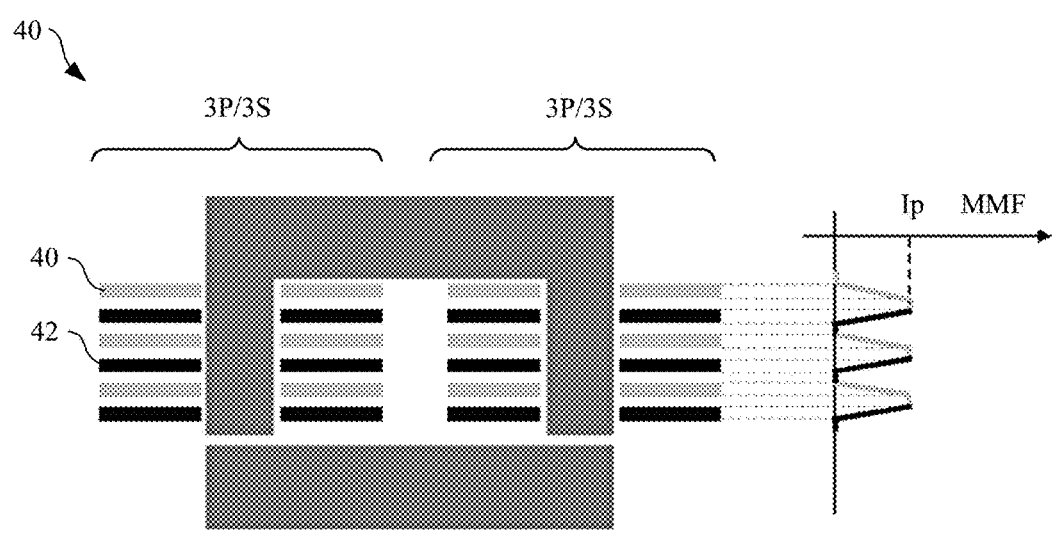
FIG. 4 illustrates an example printed circuit board (PCB) transformer with interleaved windings according to various examples described herein.

With proximity and skin effect in high frequency operation, AC winding loss can become a concern in PCB winding transformers, and a significant amount of research has been done to minimize that effect. An effective way to do so is by winding interleave, as shown in FIG. 4, where the primary windings 42 are interleaved with the secondary windings 44. Using this concept, the magneto motive force (MMF) is cancelled by interleaving the primary and secondary windings. As a result, the AC flux between windings is reduced greatly as compared with the non-interleaved case, and the AC winding loss can be significantly reduced.

The use of interleaved windings can result in low leakage inductance. Low leakage inductance is not a problem for certain types of power converters, such as where leakage inductance is not needed or relied upon. In certain applications, such as for LLC resonant converters and dual active bridge converters, however, an individual inductor may be required to supplement low leakage inductance. To reduce the number of magnetic components, it can be preferable to rely on transformer leakage inductance in place of such a separate inductor for low leakage inductance. To do so, the transformer leakage inductance should be a controlled and adjustable leakage inductance.

Some approaches have been proposed to increase the leakage inductance for Litz wire transformers. One approach is to change the distance between the primary winding and secondary windings to get larger leakage inductance. However, only a limited amount of increased leakage can be achieved using this method. Also, the leakage flux flows in the air, which can generate a significant amount of eddy current loss in the windings and interfere with other components. Another approach employs magnetic shunts to achieve leakage inductance. This approach does not rely on interleaving, and large AC winding loss can be expected. Also, the core loss of low permeability magnetic shunts is much larger than high permeability ones, resulting in large core loss. Additionally, magnetic shunts do not offer much ability to adjust the leakage inductance. Instead, the leakage is relatively hard to control and subject to change for large-scale production.

Other approaches rely upon the use of magnetic shunts in PCB winding transformers to create leakage inductance. The most common approach is to add a magnetic shunt layer between the primary and secondary winding layers. For example, between the primary and secondary windings, a low permeability magnetic shunt material can be added to serve as additional leakage flux path. By doing this, the leakage inductance can be significantly increased. However, there are two problems with this approach. First, it sacrifices the interleaved structure, which will increase the AC winding loss of the transformer. Second, it is difficult to realize this design in a PCB winding transformer.

Figure 5:
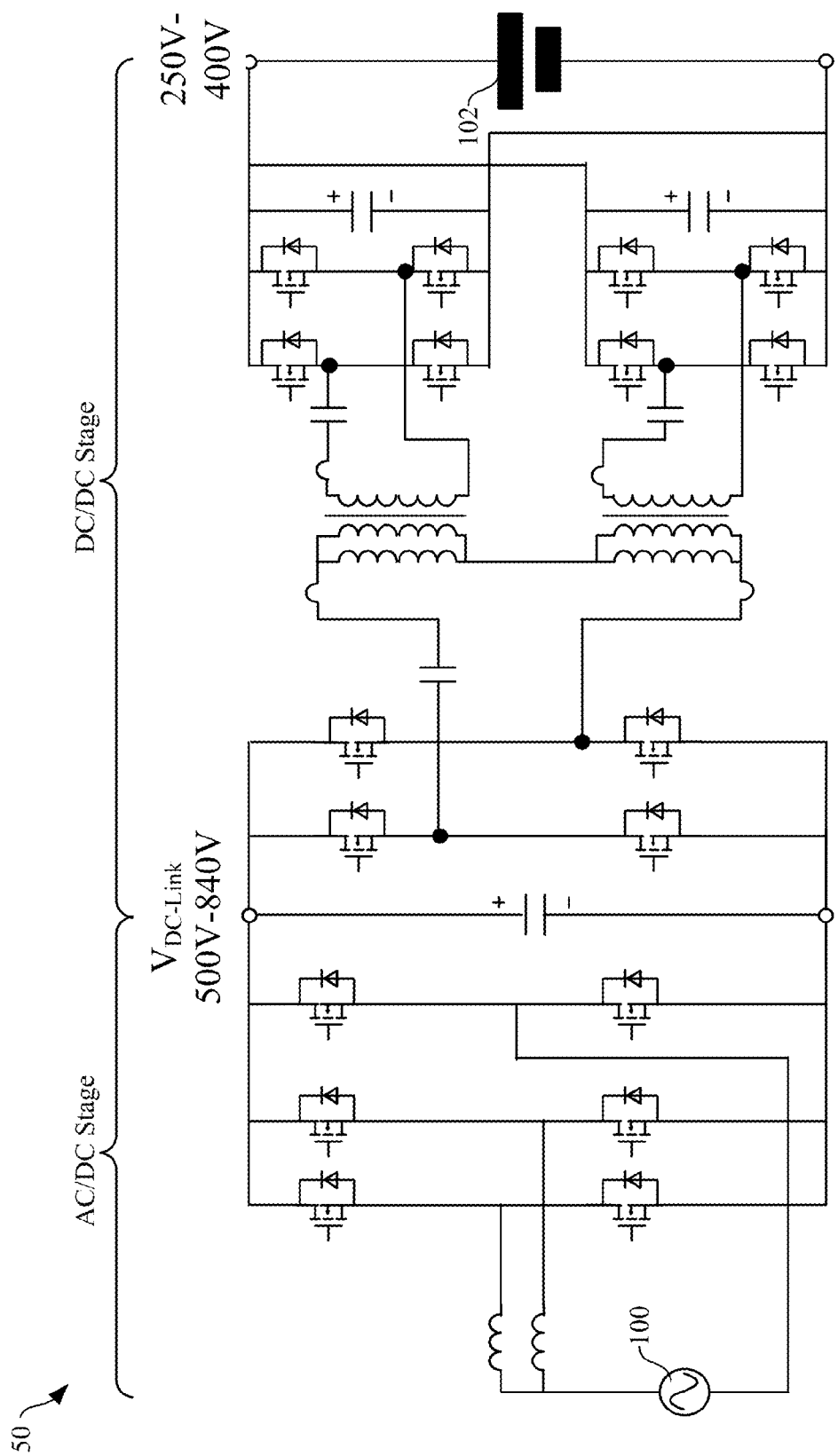
FIG. 5 illustrates an example two stage battery charger circuit with variable DC link voltage according to various examples described herein.

According to aspects of the embodiments described herein, to improve the efficiency of the DC/DC stage in a power converter or battery charger, a variable DC-link voltage structure is proposed. In that context, FIG. 5 illustrates an example two stage converter circuit 50 with variable DC link voltage according to various examples described herein. The converter circuit 50 includes a first AC/DC converter stage configured to convert power at a first voltage from the power grid 100 to power at an intermediate link voltage $V_{DC\text{-}Link}$. The converter circuit 50 further includes a second DC/DC converter stage configured to convert the power at the intermediate link voltage $V_{DC\text{-}Link}$ to power for charging a battery 102. The converter circuit 50 can be operated in a number of different modes, including charging and discharging modes for the battery 102.

Both the AC/DC and DC/DC stages in the converter circuit 50 include an arrangement of switching transistors as shown in FIG. 5, although other arrangements are within the scope of the embodiments. The switching transistors can be embodied as any suitable type of semiconductor (or other) power switches, such as power bipolar transistors or power insulated gate bipolar transistors (IGBTs), among others, depending upon the switching frequency of the stages of the converter circuit 50 and other factors. However, certain semiconductor power switches, such as IGBTs, may not be suitable for use at higher speed switching frequencies. To the extent necessary for higher speed switching operations, the switching transistors can be embodied as metal oxide semiconductor field effect transistors (MOSFETs), such as silicon carbide (SiC) MOSFETs.

Although FIG. 5 illustrates an example converter circuit suitable for use in battery charging and discharging, the efficiency, regulation, and control concepts described herein can be applied to other converter circuit arrangements. For example, the second stage is not limited to a resonant converter as shown in FIG. 5, as a number of different DC/DC converter stages (e.g., resonant, phase shift and PWM types) can be used. Overall, as compared with the conventional fixed DC-link voltage concept, as shown in FIG. 2, the intermediate link voltage $V_{DC\text{-}Link}$ in the proposed concepts can change over time according to the voltage of the battery 102 as it is being charged.

Figure 6A:
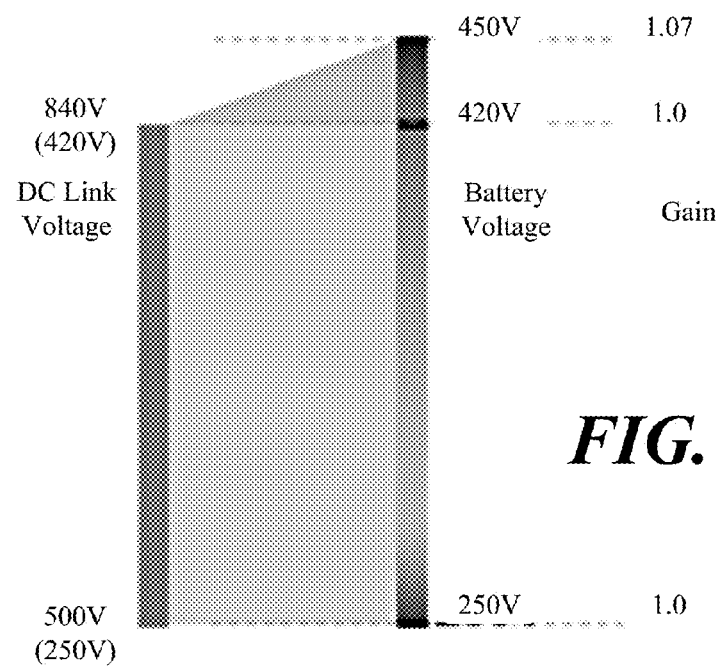
FIG. 6A illustrates an example gain range of a DC/DC stage in the battery charger circuit shown in FIG. 5 according to various examples described herein.

FIG. 6A illustrates an example gain range of the DC/DC stage in the converter circuit 50 shown in FIG. 5. As shown in the example of FIG. 6A, the $V_{DC\text{-}Link}$ voltage can track the charging voltage of the battery 102 over a range from 250V to 420V. Over that range, the gain the DC/DC stage can be substantially maintained at a constant value of about 1. If the charging voltage of the battery 102 exceeds the $V_{DC\text{-}Link}$ voltage, the gain of the DC/DC stage can be can rise, for example, to about 1.07.

Figure 6B:
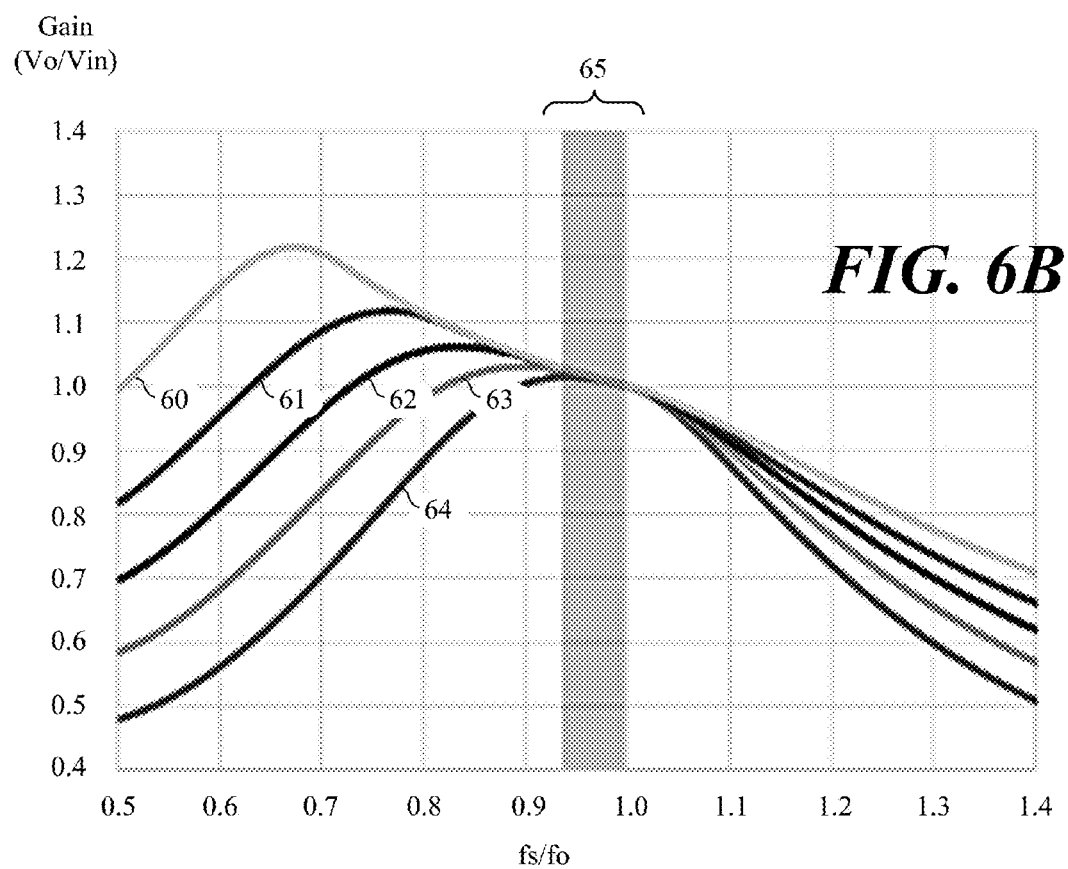
FIG. 6B illustrates example gain curves over frequency for the battery charger circuit structure shown in FIG. 5 according to various examples described herein.

FIG. 6B illustrates example gain curves over frequency for the converter circuit 50 shown in FIG. 5. The switching frequency fs/fo in FIG. 6B is the switching frequency of the DC/DC stage of the converter circuit 50 shown in FIG. 5. Each of the gain curves 60-64 in FIG. 6B is representative of a variation the DC/DC stage (e.g., different inductor values, etc.). Because the gain of the DC/DC stage can be maintained close to 1 for several battery charging stages, the switching frequency can be maintained within a relatively narrow zone 65. Thus, according to the concepts described herein, the gain range and efficiency range of the converter circuit 50 can be reduced, and better efficiency can be expected.

Figure 7A:
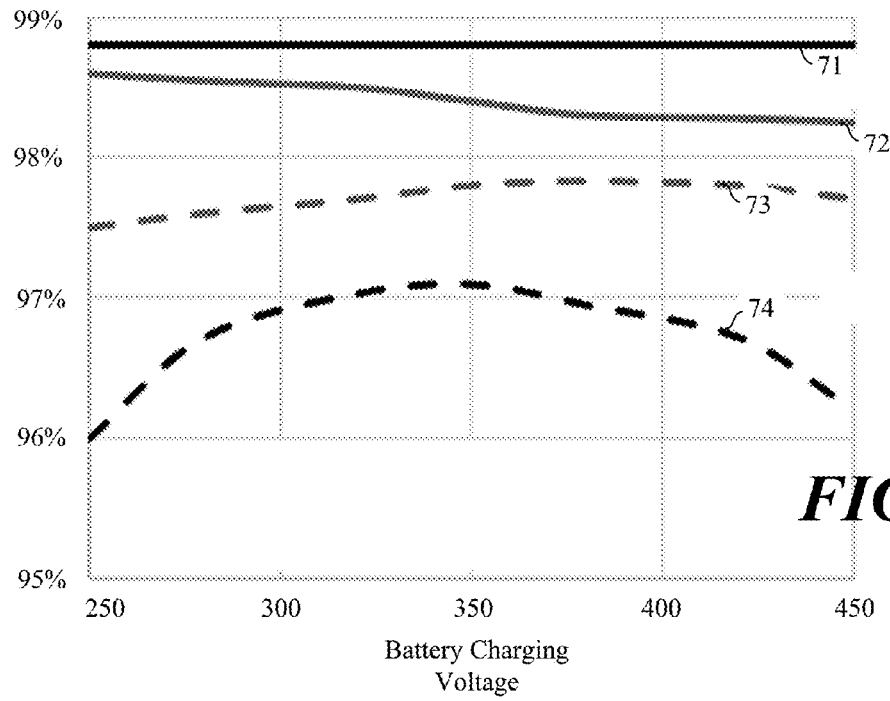
FIGS. 7A and 7B illustrate example efficiency curves for comparison of the fixed DC link battery charger circuit structure shown in FIG. 2 and the variable DC link battery charger circuit structure shown in FIG. 5 according to various examples described herein.
Figure 7B:
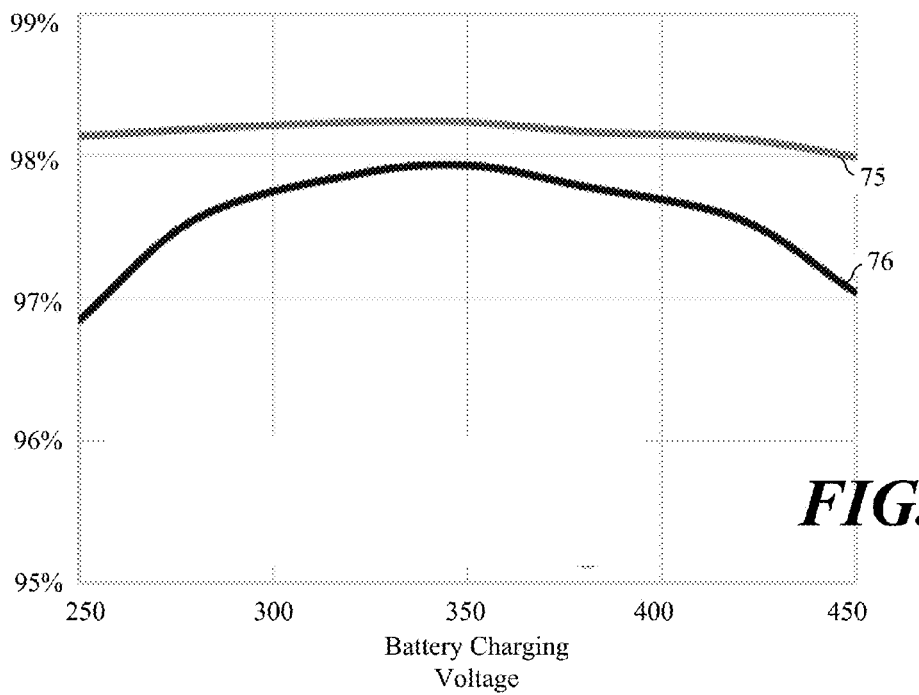

In the context of efficiency, FIGS. 7A and 7B illustrate example efficiency curves for comparison of the fixed DC link battery charger circuit 20 shown in FIG. 2 and the variable DC link converter circuit 50 shown in FIG. 5. In FIG. 7A, the curves 71 and 72 are representative of example efficiency curves for the AC/DC stage of the battery charger circuit 20 shown in FIG. 2 and the converter circuit 50 shown in FIG. 5, respectively. The curves 73 and 74 are representative of example efficiency curves for the DC/DC stage of the converter circuit 50 shown in FIG. 5 and the battery charger circuit 20 shown in FIG. 2, respectively. Although the AC/DC stage of the battery charger circuit 20 is slightly more efficient than the converter circuit 50, the DC/DC stage of the converter circuit 50 is significantly more efficient than the converter circuit 50, particularly at the higher and lower ends of the battery charging voltage range. In FIG. 7B, the curve 75 is the product of the curves 72 and 73 in FIG. 7A, and curve 76 is the product of the curves 71 and 74 in FIG. 7A. From FIG. 7B, the efficiency gain of the converter circuit 50 as compared to the battery charger circuit 20 is clear.

Figure 7C:
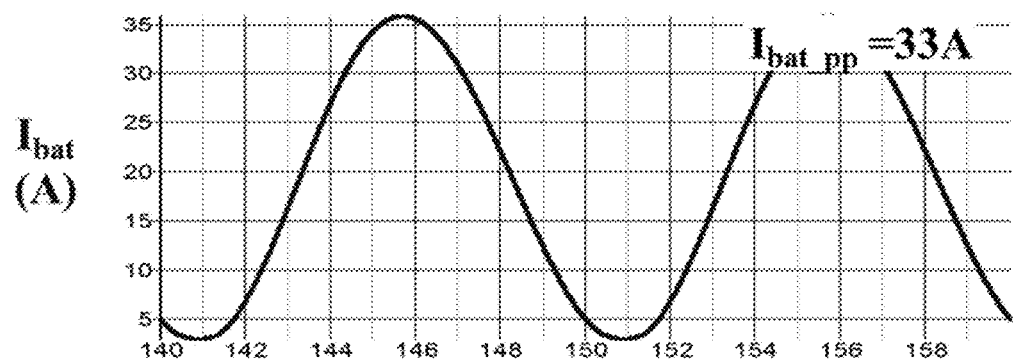
FIG. 7C illustrates an example battery charging current without DC/DC stage ripple control according to various examples described herein.

However, due to the need for input power factor correction in the converter circuit 50, 2nd order line frequency harmonic power flows in the converter. If there is no additional control of the second DC/DC converter stage, the output current (i.e., battery charging current) can have a significant level of 2nd order line frequency ripple as shown in FIG. 7C. According to the concepts described herein, a two stage variable DC-link voltage control strategy is proposed to suppress the relatively large current ripple.

Figure 8:
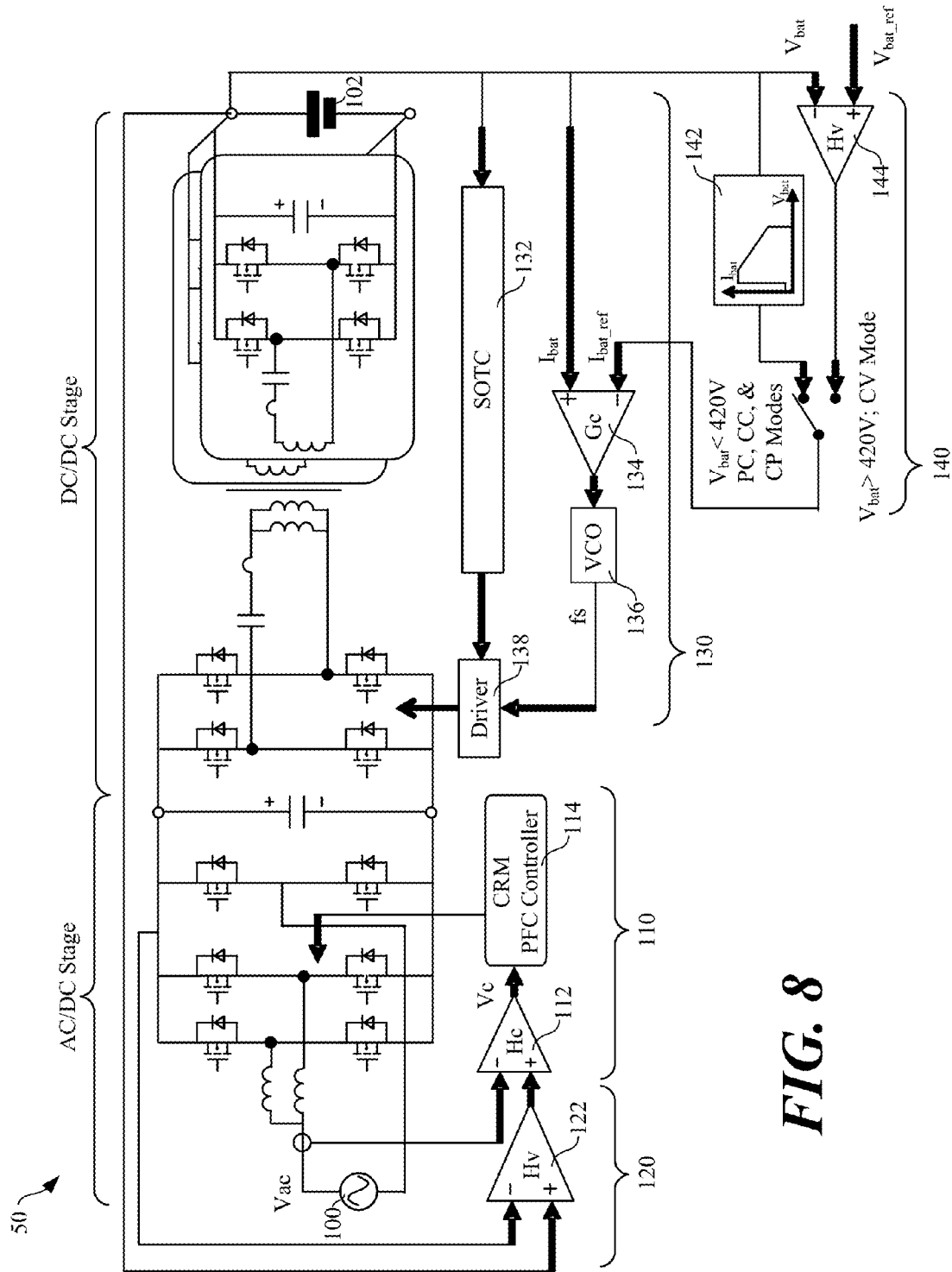
FIG. 8 illustrates an example converter circuit and two stage control strategy for the converter circuit in grid tied mode according to various examples described herein.

FIG. 8 illustrates the converter circuit 50, with first AC/DC and second DC/DC converter stages, and two stage control strategy for the converter circuit 50 in grid tied mode. Power can be converted bi-directionally in the converter circuit 50. In other words, power can flow from the power grid 100 to charge the battery 102, and power can flow from the battery 102 to the power grid 100 or another load. In FIG. 8, the power grid 100 is representative of various types of power grids, including local and utility power grids, and the converter circuit 50 is said to be operated in grid tied mode. In grid tied mode, the battery 102 of the converter circuit 50 can operate in both charging and discharging modes, and the control strategy varies among those modes as described below. The converter circuit 50 can also be operated in a stand-alone inverter mode, without electrical connection to the power grid 100, and the battery 102 can be discharged into a load in that case.

Figure 7D:
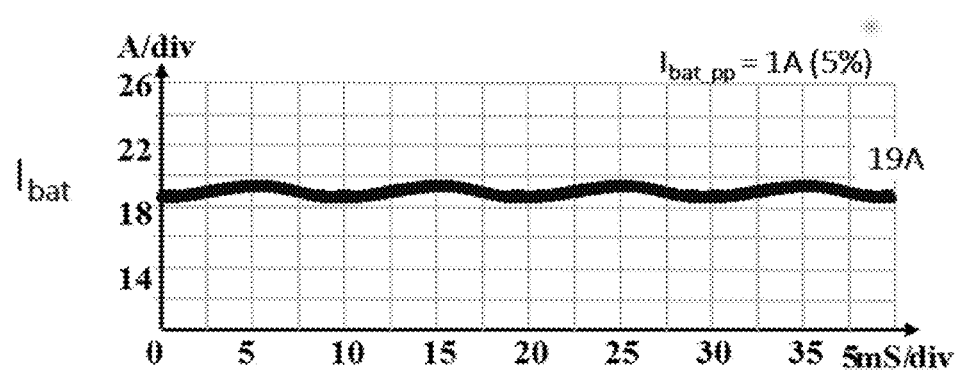
FIG. 7D illustrates an example battery charging current with DC/DC stage ripple control according to various examples described herein.

In both charging and discharging grid tied modes, four control loops are relied upon in the converter circuit 50. As shown in FIG. 8, the control loops include a critical conduction mode (CRM) power factor correction (PFC) control loop 110, an intermediate link voltage regulation control loop 120, a ripple regulation control loop 130, and a charging profile control loop 140. Through the application of the control strategy shown in FIG. 8, the output current ripple (i.e., battery charging current) can be significantly reduced as shown in FIG. 7D.

The control loop 110 includes a compensator 112 and a CRM/PFC controller 114. The control loop 120 includes a compensator 122. The control loop 130 includes a Simplified Optimal Trajectory Controller (SOTC) 132, a compensator 134, a voltage controlled oscillator 136, and a driver 138. The control loop 140 includes a charge profile controller 142 and a compensator 144.

Among other components, the control loops 110, 120, 130, and 140 can include one or more proportional—integral (PI) and/or proportional-resonant (PR) controllers. The control loops 110, 120, 130, and 140 are configured to continuously calculate certain error values as differences between desired operating characteristics of the converter circuit 50 and measured operating characteristics (e.g., voltages, currents, frequencies, etc.) in the converter circuit 50. Based on the error values, the outputs of the control loops can be relied upon to generate switching control signals for the switching transistors in the first AC/DC and second DC/DC converter stages of the converter circuit 50. The control loops can be embodied in the form of hardware, firmware, software executable by hardware, or any combination thereof.

The control loop 110 is configured to perform CRM/PFC control for the converter circuit 50 based on an output of the control loop 120. The output of the CRM/PFC controller 114 of the control loop 110 is used to drive the switching transistors of the AC/DC stage of the converter circuit 50. The control loop 120 is configured to regulate the DC-link voltage between the AC/DC stage and the DC/DC stage in the converter circuit 50. To do so, the control loop 120 senses the voltage of the DC-link and the battery 102, and those voltages are used as reference inputs to the compensator 122 to regulate the input power. An output of the compensator 122 of the control loop 110 is provided as an input to the compensator 112 of the the control loop 120.

The compensator 134 in the control loop 130 is configured to sense the charging current, $I_{bat}$, of the battery 102 and develop a control signal to regulate the gain of the DC/DC stage through the VCO 136 by changing the frequency (e.g., for a resonant converter), phase shift angle (e.g., for a dual active bridge or phase shift full bridge), or duty cycle (e.g., for a PWM converter) of the switching control signals for the switching transistors in the DC/DC stage of the converter circuit 50. The SOTC 132 of the control loop 130 is configured to control certain transient, startup, and burst conditions for the converter circuit 50 based on the current reference $I_{bat}$. The SOTC 132 can be embodied as a controller similar to that described in U.S. Patent Publication No. 2016/0294297, the entire contents of which are hereby incorporated herein by reference. The driver 138 is configured to provide drive signals to drive the switching transistors of the DC/DC stage of the converter circuit 50.

The charge profile controller 142 of the control loop 140 is configured track the charging profile of the battery 102. The charging profile can include four stages, including a pre-charge mode, constant current charge mode, constant power charge mode, and constant voltage charge mode. In the former three modes, a current reference $I_{bat\_ref}$ is provided by the charge profile controller 142 to the compensator 134. In the constant voltage charge mode, a separate voltage reference $V_{bat\_ref}$ can be provided as a reference to the compensator 134.

Figure 9:
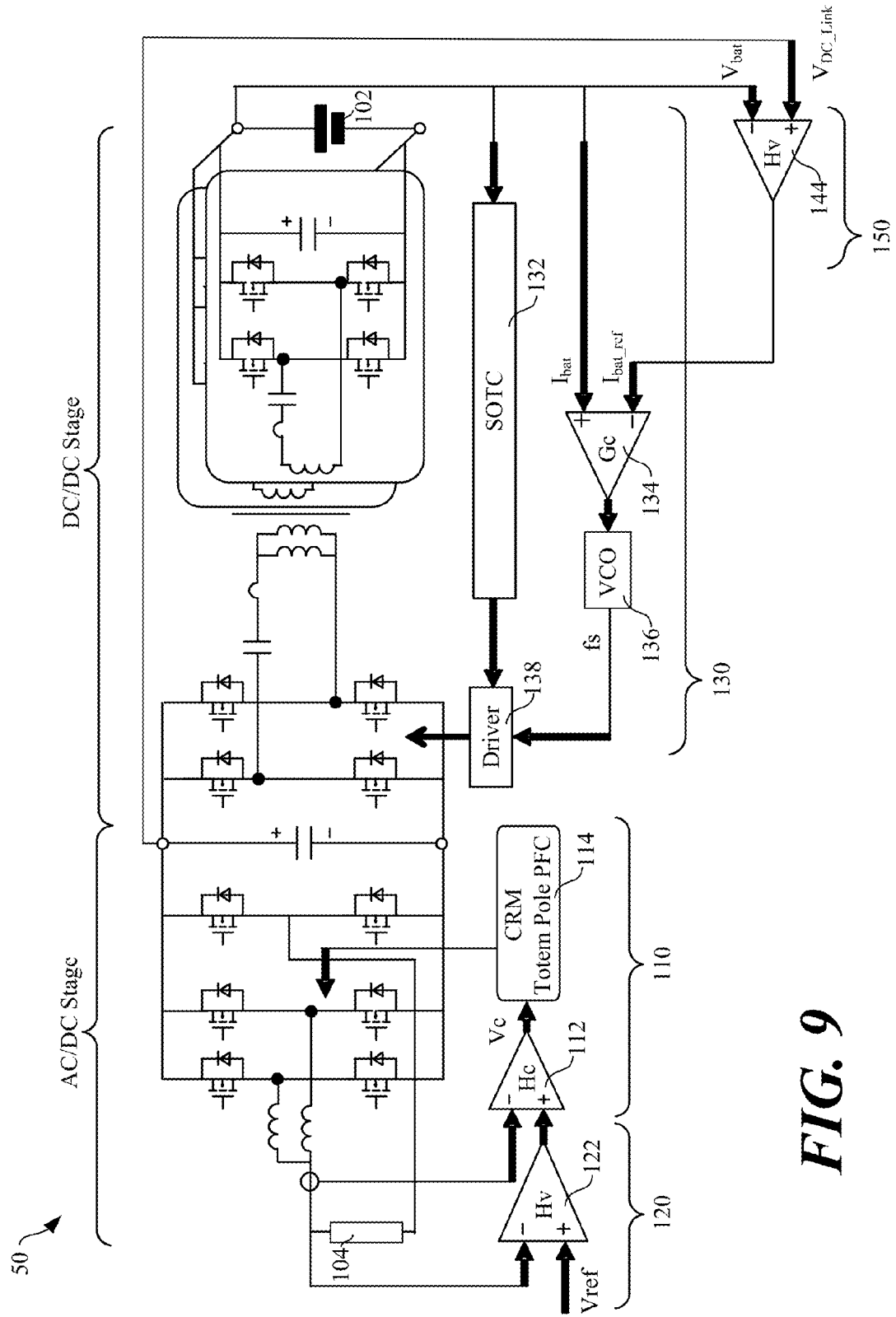
FIG. 9 illustrates an example converter circuit and two stage control strategy for the converter circuit in stand-alone battery discharging mode according to various examples described herein.

FIG. 9 illustrates the converter circuit 50 and two stage control strategy for the converter circuit 50 in stand-alone battery discharging mode. For discharging, there are two conditions that require a different control strategy. For grid-tied discharging mode, the control strategy and the function of each loop is the same as in charging mode. However, for standalone (e.g., not grid-tied) mode, the responsibility of regulating the DC-link voltage falls to the DC/DC stage because the PFC needs to regulate the output AC voltage.

As compared to the configuration shown in FIG. 8, the converter circuit 50 is coupled to a load 104 rather than to the power grid 100. Further, in this mode of operation, rather than the battery 102 being charged, the battery 102 is being discharged, and power is supplied to the load 104. To that end, the charging profile control loop 140 is configured as an intermediate link voltage reference loop 150, and the operations of the charge profile controller 142 can be neglected or omitted (e.g., not used). The compensator 144 in the intermediate link voltage reference loop 150 compares the voltage of the battery 102 with the voltage of the DC-link to provide the current reference $I_{bat\_ref}$ to the ripple regulation control loop 130. In this case, the intermediate link voltage reference loop 150 and ripple regulation control loop 130 are configured, in a second mode of operation, to regulate the voltage of the DC-link through the DC/DC converter stage based on the voltage of the battery 102.

For the AC/DC stage shown in FIG. 8, a bidirectional totem-pole PFC rectifier/inverter operating at CRM is demonstrated for the first time. The control of the CRM rectifier is relatively straight forward because a unity power factor can be nearly achieved with constant on-time control. Only a simple voltage mode control loop with very low bandwidth needed. Later, variable on-time control, which is an enhanced version of constant on-time control, is also demonstrated in order to further reduce input current distortion.

However, neither constant on-time control nor variable on-time control may be suitable for a CRM inverter. Some control systems attempt to use hysteresis control for a CRM inverter. However, the current-sensing method in is not applicable for a multi-phase interleaved structure. Further, high-frequency instantaneous current sensing can become a bottleneck for the CRM inverter using hysteresis control. For example, the DCR sensing-derived inductor current-sensing method is not applicable, since the common-mode voltage across the inductor is too large in offline applications and a sensing resistor in series with the bottom switch does not work in the negative line cycle. Thus, the sensing resistor in the return path is suitable for single-phase topology but not a multiphase topology with interleaving. Further, the current transformer (CT) method can be applied applicable, but each high-frequency switch needs one CT connected in series, which makes the critical power loop very large. That can induce significant switching loss and parasitic ringing.

Figure 10:
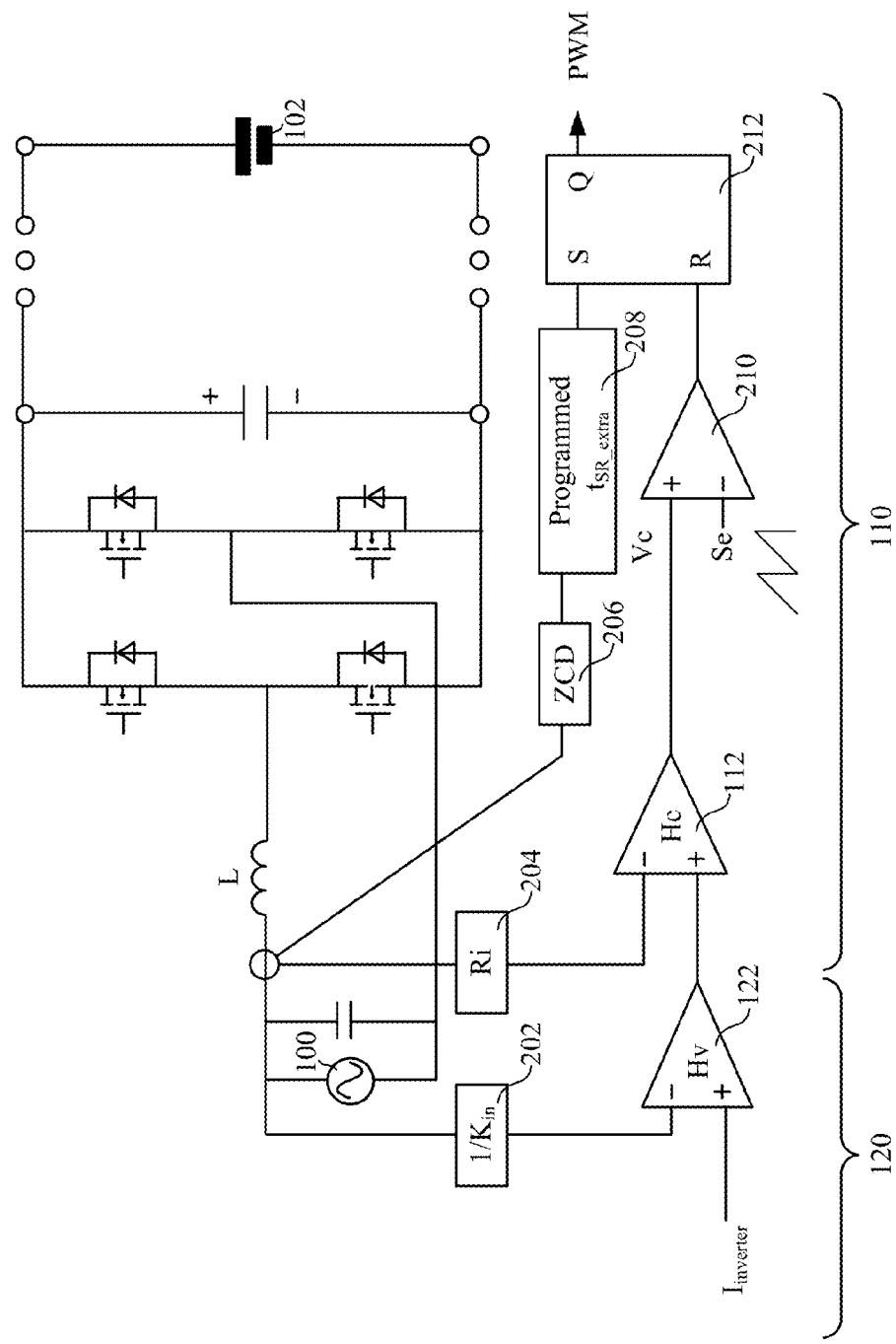
FIG. 10 illustrates an example control strategy for a grid-tied inverter according to various examples described herein.
Figure 11:
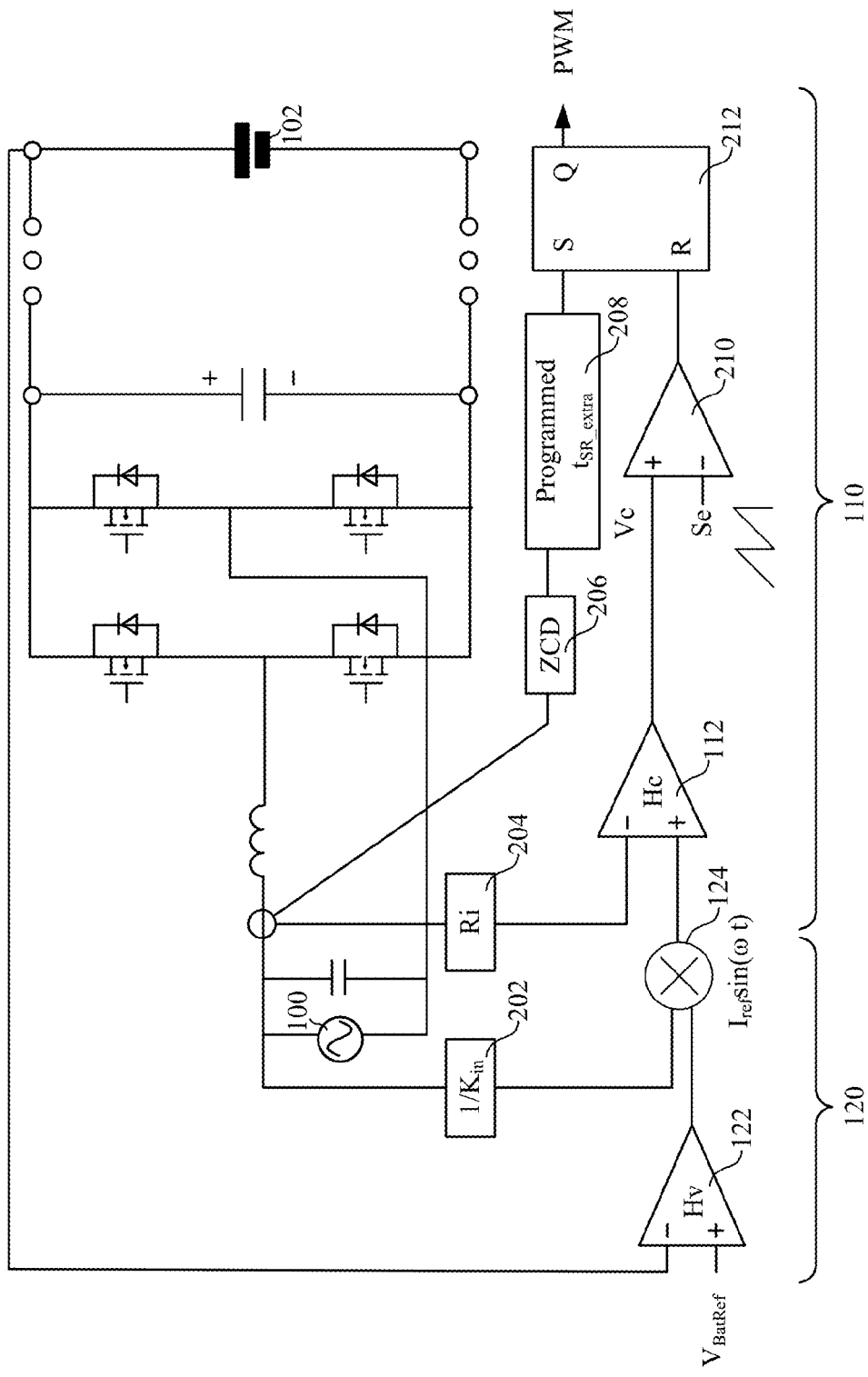
FIG. 11 illustrates an example control strategy for a grid-tied rectifier according to various examples described herein.
Figure 12:
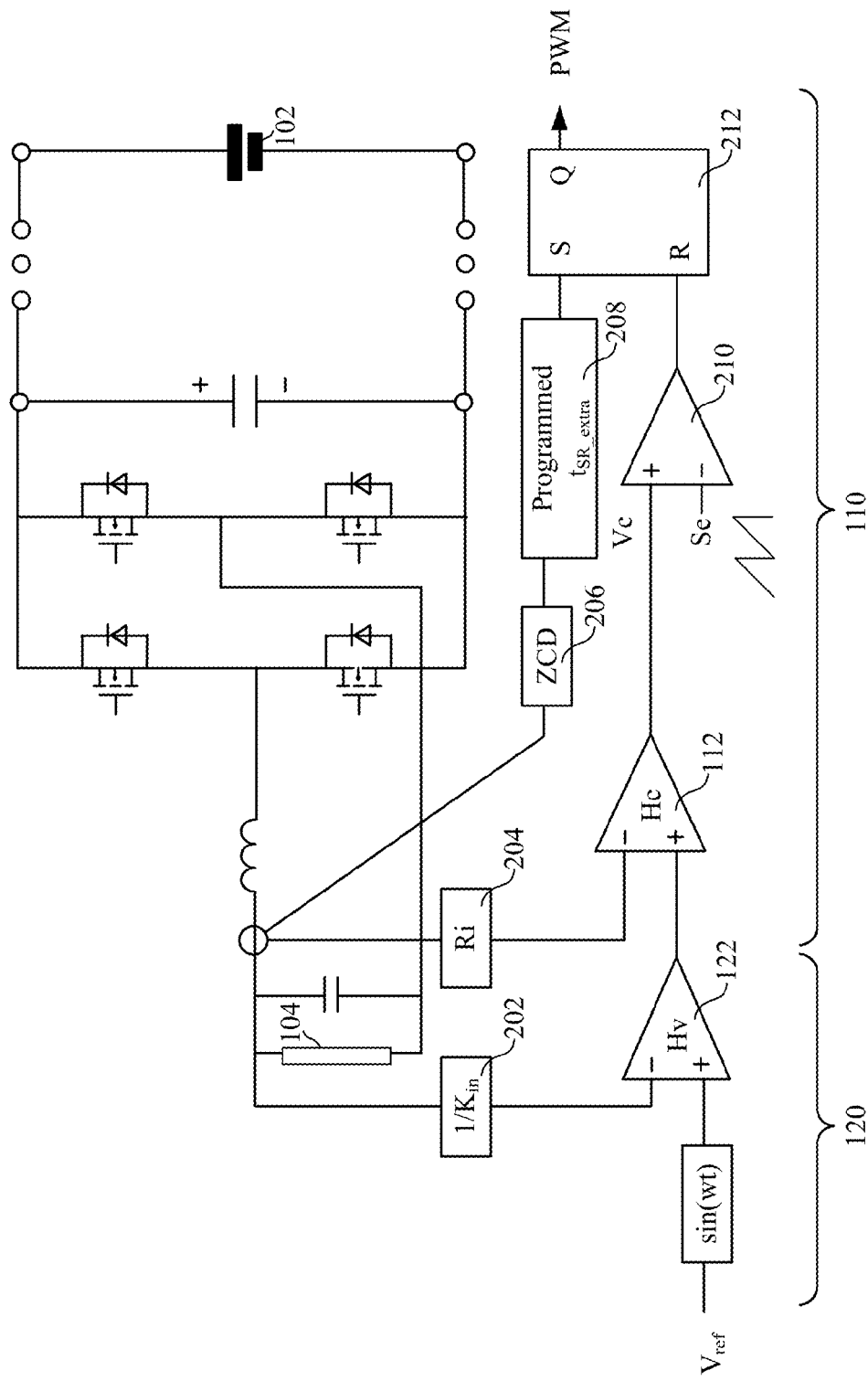
FIG. 12 illustrates an example control strategy for a stand-alone inverter according to various examples described herein.

In order to avoid instantaneous current sensing, a hybrid control strategy combining average current control and part hysteresis control is proposed, as illustrated in FIGS. 10-12. FIG. 10 illustrates an example control strategy for when the converter circuit 50 is configured in grid-tied inverter mode. In that case, the converter circuit 50 is operated in a mode in which the battery 102 is providing power to the power grid 100, and the compensator 122 receives a reference inverter current $I_{inverter}$. Here, in addition to the compensator 112, the control loop 110 is shown to include a proportional unit 204, a zero crossing detector 206, a programmed timer 208, a comparator 210, and a flip flop 212. Further, in addition to the compensator 122, the control loop 120 includes a proportional unit 202.

The zero crossing detector 206, programmed timer 208, and comparator 210 are configured to control the switching cycle CRM operation to achieve zero voltage switching (ZVS) through the entire line cycle. The zero crossing detector 206, programmed timer 208, and comparator 210 are thus configured to control the minimum current in the inductor L, shown as $I_{L\_neg}$ in FIG. 13. The turn off time of the synchronous rectifier of the converter circuit 50 is extended by the programmed timer 208. Thus, the programmed timer 208 extends the negative current to the desired value.

Figure 13:
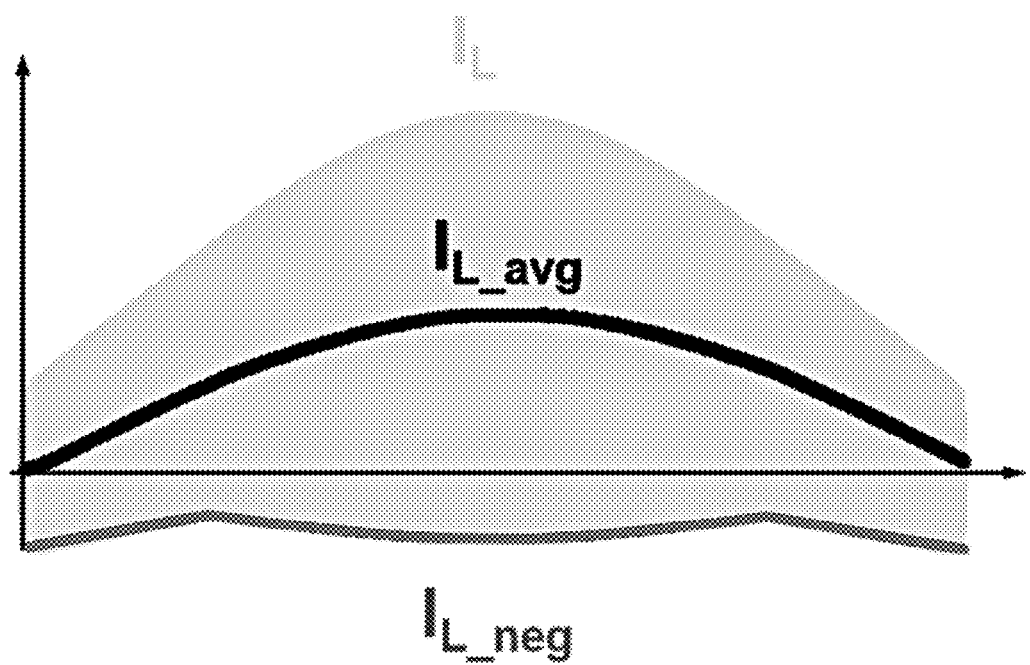
FIG. 13 illustrates an example simulation waveform for the control strategy illustrated in FIG. 9 according to various examples described herein.

The proportional unit 204 and the compensator 112 are configured to control the average current in the inductor L to track the desired sinusoidal reference, shown as $I_{L\_avg}$ in FIG. 13. The proportional unit 202 and the compensator 122 are configured to control based on the inverter current in grid-tied inverter mode as shown in FIG. 10, the AC/DC input current in grid-tied rectifier mode as shown in FIG. 11, and the inverter output voltage in stand-alone inverter mode as shown in FIG. 12. In one embodiment, the comparator 210 receives a constant sawtooth reference Se to compare with the output of the compensator 112. The outputs of the programmed timer 208 and the comparator 210 are provided as set and reset inputs, respectively, to the flip flop 212, and the output of the flip flop 212 is used as a PWM control signal for the AD/DC stage. A simulation waveform is shown in FIG. 13 to verify the proposed control method.

FIG. 11 illustrates an example control strategy for when the converter circuit 50 is configured as a grid-tied rectifier. In that case, the converter circuit 50 is operated in a mode in which the battery 102 is being charged by the power grid 100, and the compensator 122 receives a reference battery voltage $V_{BatRef}$. As compared to the configuration shown in FIG. 10, the control loop 120 includes a mixer 124 between the compensator 122 and the compensator 112.

FIG. 12 illustrates an example control strategy for when the converter circuit 50 is configured as a stand-alone inverter. In that case, the converter circuit 50 is operated in a mode in which the battery 102 is providing power to the load 101, and the compensator 122 receives a reference voltage $V_{ref}$.

Another benefit of the variable DC-link voltage concepts described herein is that the resonant inductor can be relatively smaller as compared as to the conventional use of fixed DC-link voltages. This provides the opportunity to use PCB winding transformers and the leakage inductance of such transformers as a resonant inductor.

Figure 14A:
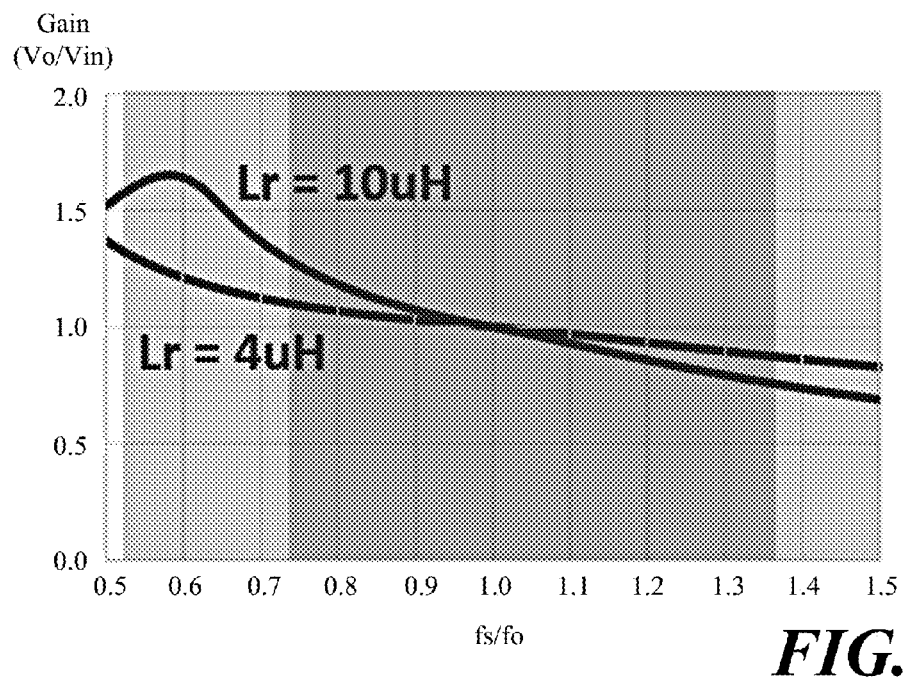
FIG. 14A illustrates example gain curves for an LLC type resonant converter with different resonant inductances over a frequency range for a fixed DC link according to various examples described herein.
Figure 14B:
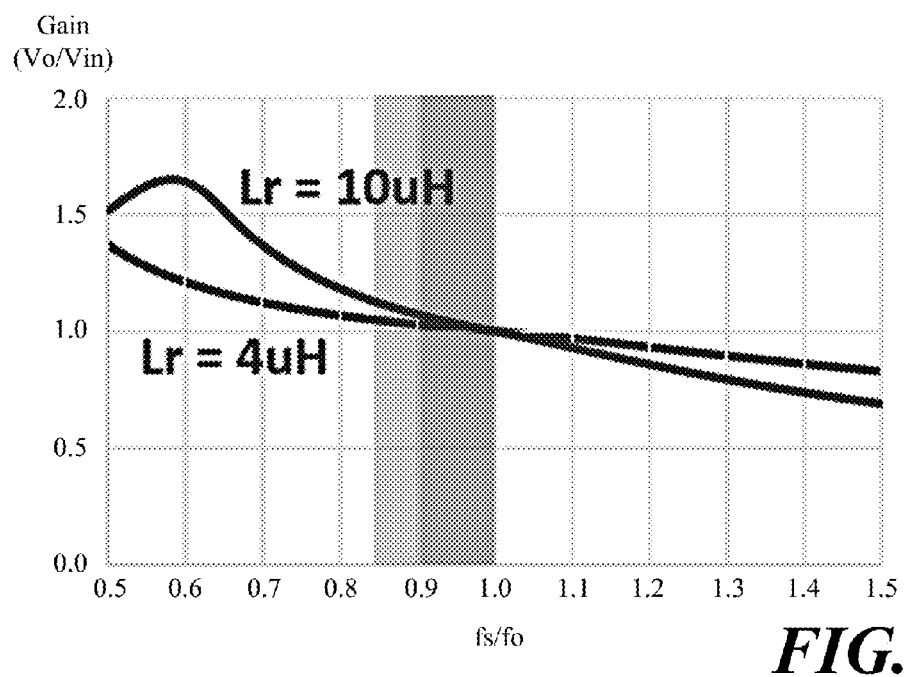
FIG. 14B illustrates example gain curves for an LLC type resonant converter with different resonant inductances over a frequency range for a variable DC link according to various examples described herein.

FIG. 14A illustrates example gain curves for an LLC type resonant converter with different resonant inductances over a frequency range for a fixed DC link, and FIG. 14B illustrates example gain curves for an LLC type resonant converter with different resonant inductances over the same frequency range for a variable DC link. Looking at both FIGS. 14A and 14B, it is clear that larger resonant inductors are associated with steeper gain curves, given the same turns ratio and load and magnetizing inductance. When using a conventional fixed DC-link voltage, the frequency range is very important for achieving high efficiency. Therefore, a larger resonant inductor can be preferable. However, when using the proposed variable DC-link, the size of the resonant inductor does not have such a significant impact across the frequency range, as the gain range is already very small as shown by the comparison of FIG. 14A with FIG. 14B. Therefore, a smaller resonant inductor can be used according to the concepts described herein.

Figure 15:
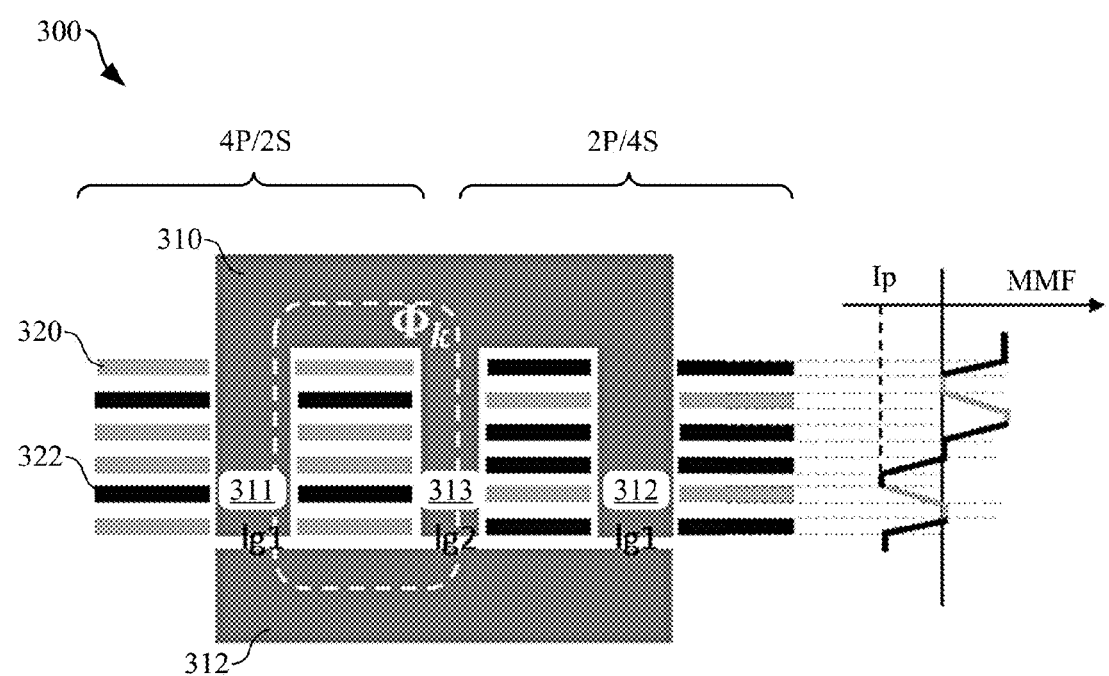
FIG. 15 illustrates an example transformer with leakage integration according to various examples described herein.

To achieve the desired leakage inductance with a PCB winding transformer without sacrificing a significant amount of AC winding loss, a new E-I transformer structure is proposed. In that context, FIG. 15 illustrates an example transformer 300 with leakage integration. The transformer 300 can be embodied as a PCB or other type of transformer. The transformer 300 includes an E-shaped core 310, an I-shaped core 312, a primary winding 320, and a secondary winding 322.

The transformer 300 is different than conventional E-I transformers. Windings are placed on the outer posts 311 and 312 of the core 310 instead of the center post 313. Further, the volume or area of the center post 313 is not two times that of either of the outer posts 311 or 312, but can be adjusted according to the desired leakage inductance. Another difference is that the windings are re-distributed as compared to conventional E-I transformers. In other words, on the two outer posts 311 and 312, the number of the primary windings 320 and the secondary windings 322 are not distributed equally.

Additionally, the center post 313 is used as a leakage path. By doing so, leakage flux is created without much change in the interleaving between the primary winding 320 and secondary winding 322. With this feature, the leakage inductance of the transformer 300 can be controlled by adjusting the reluctance of the center post 313. By increasing the reluctance of the center post 313, less leakage flux will flow through center post 313. Thus, the leakage of the transformer 300 can be reduced. By reducing the reluctance of the center post 313, more leakage flux will flow through center post 313. Thus, the leakage of the transformer 300 can be increased.

Figure 16:
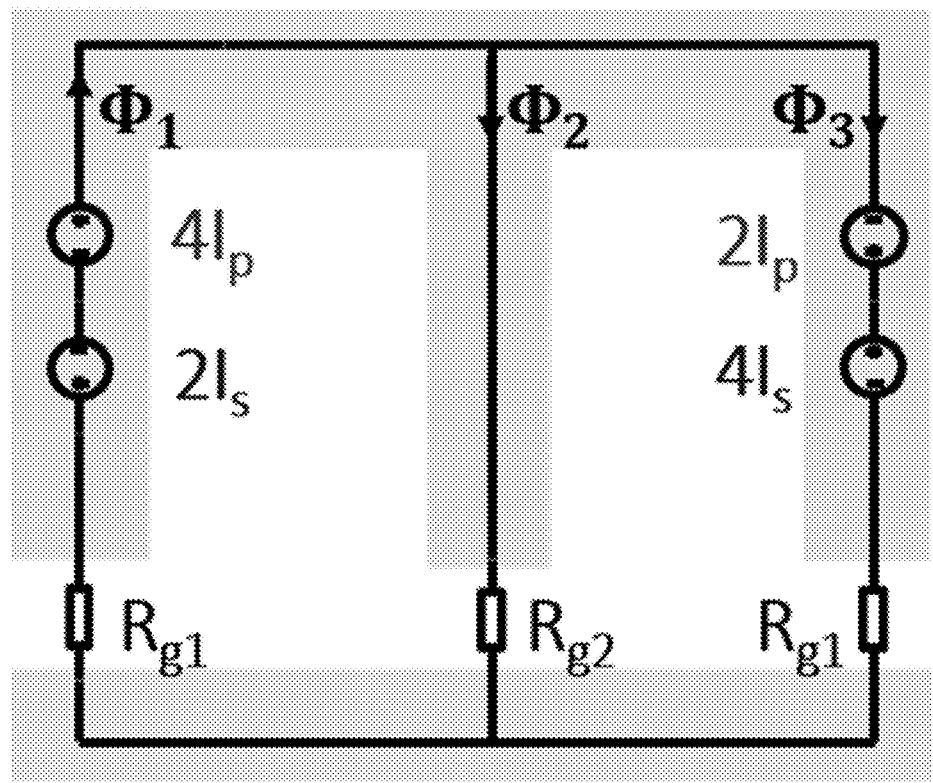
FIG. 16 illustrates an example reluctance model of the transformer shown in FIG. 15 according to various examples described herein.

FIG. 16 illustrates an example reluctance model of the transformer 300 shown in FIG. 15. Based on the reluctance model, the transformer equation for the transformer 300 is as follows:

$$\begin{bmatrix} v_p \\ v_s \end{bmatrix} = \begin{bmatrix} \frac{18}{R_{g1}} + \frac{2}{R_{g1}+2R_{g2}} & \frac{18}{R_{g1}} - \frac{2}{R_{g1}+2R_{g2}} \\ \frac{18}{R_{g1}} - \frac{2}{R_{g1}+2R_{g2}} & \frac{18}{R_{g1}} + \frac{2}{R_{g1}+2R_{g2}} \end{bmatrix} \begin{bmatrix} i_p \\ i_s \end{bmatrix} \quad (1)$$

Figure 17:
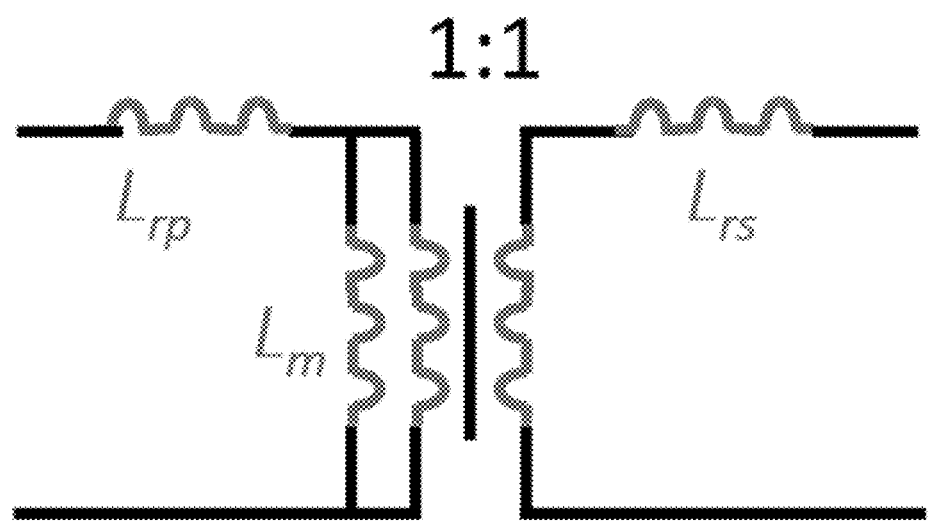
FIG. 17 illustrates an example T-type transformer equivalent circuit of the transformer shown in FIG. 15 according to various examples described herein.

If the T-type transformer equivalent circuit shown in FIG. 17 for the transformer 300 is used, then the magnetizing inductance and leakage inductance are as follows:

$$L_m = \frac{18}{R_{g1}} - \frac{2}{R_{g1}+2R_{g2}} \quad (2)$$

$$L_k = \frac{4}{R_{g1}+2R_{g2}} \quad (3)$$

$$R_{g1} = \frac{l_1}{\mu_r \mu_0 A_{e1}}, \text{ and} \quad (4)$$

$$R_{g2} = \frac{l_2}{\mu_r \mu_0 A_{e2}}, \quad (5)$$

where $R_{g1}$ and $R_{g2}$ are the reluctance of the outer post 311 and 312 air gap and the center post 313 air gap, respectively.

Equations (2) and (3) mathematically show that, by changing the outer post 311 and 312 and center post 313 air gap reluctance, the magnetizing inductance and leakage inductance of the transformer 300 can be adjusted individually. In practice, if the leakage inductance of the transformer 300 needs to be increased, then the center post air gap can be increased by reducing the length of the center post 313. If the leakage inductance of the transformer 300 needs to be reduced, then the center post air gap can be reduced by increasing the length of the center post air 313.

Figure 18A:
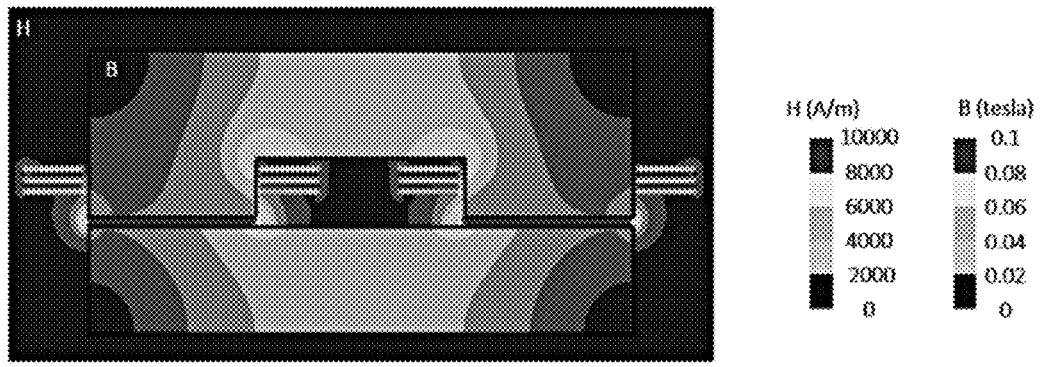
FIG. 18A illustrates an example 2D finite element analysis (FEA) of a PCB winding transformer without resonant inductance integration according to various examples described herein.
Figure 18B:
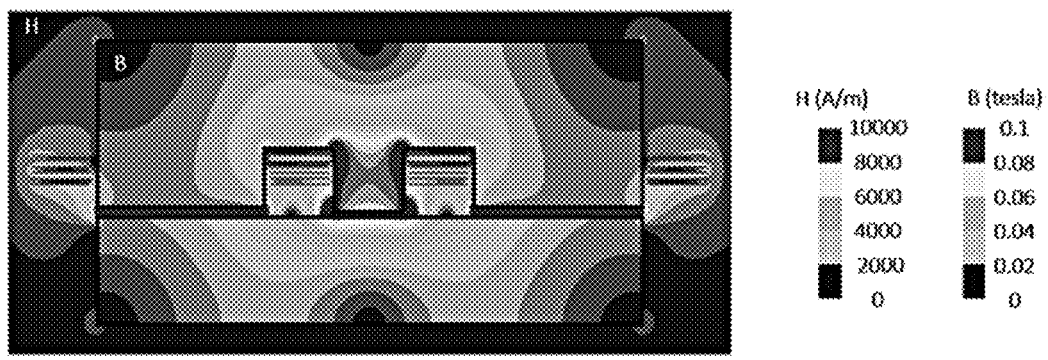
FIG. 18B illustrates an example 2D FEA of a proposed PCB winding transformer according to various examples described herein.

FIG. 18A illustrates an example 2D FEA of a PCB winding transformer, and FIG. 18B illustrates an example 2D FEA of another PCB winding transformer. Comparing FIG. 18B with FIG. 18A, it can be seen that using the proposed transformer structure leads to an increase in leakage inductance. In the example shown, the leakage inductance is increased over 15 times, from about 103 nH to about 1.5 uH. It can also be seen that the leakage flux is well confined within the core material instead of flowing throughout the air. This brings certain benefits, such as less electromagnetic interference (EMI) and no additional eddy current loss.

Figure 19:
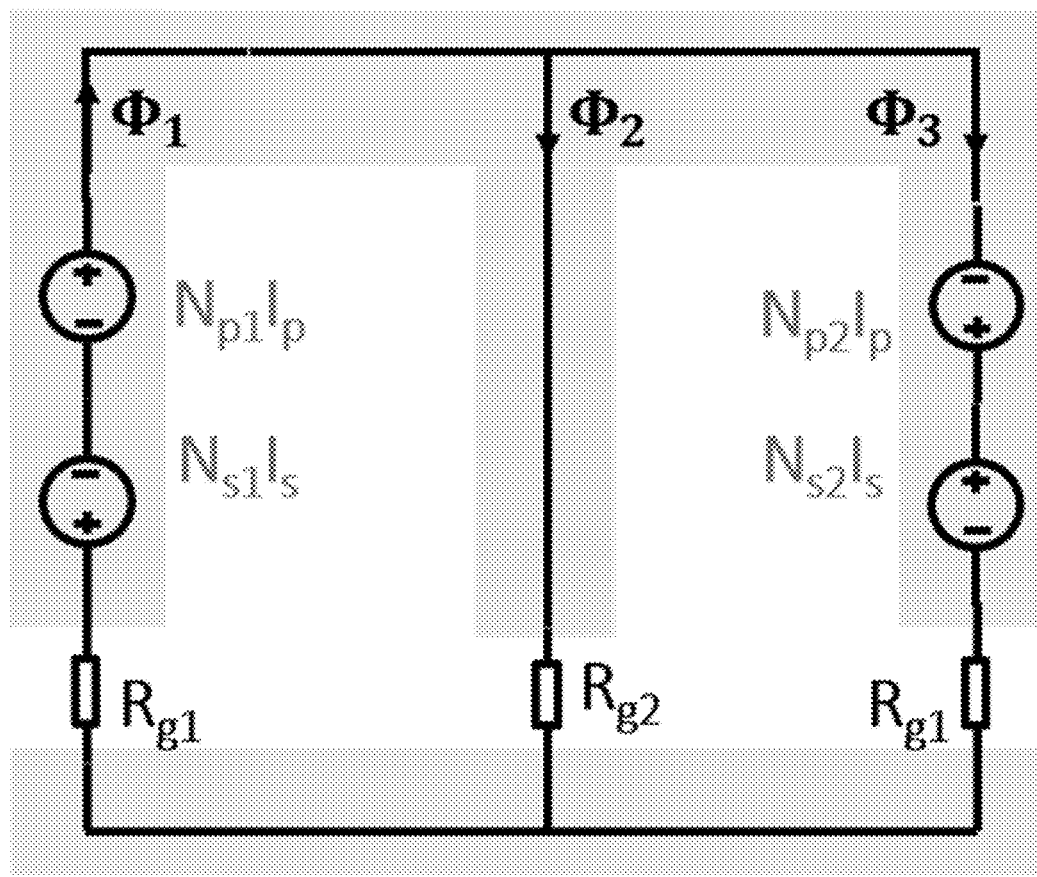
FIG. 19 illustrates an example reluctance model of another PCB winding transformer with adjustable leakage inductance according to various examples described herein.

The proposed concept can be extended to a more generalized concept, as shown in FIG. 19. FIG. 19 illustrates an example reluctance model of another PCB winding transformer with adjustable leakage. The number of primary and secondary windings on each outer post can be distributed arbitrarily. The air gap reluctance of the center post can be adjusted to control the leakage inductance. However, by changing the distribution pattern of the primary and secondary windings, the achievable leakage inductance can also be changed. For example, if the primary and secondary side windings have more interleaving, then the leakage inductance will be smaller. On the other hand, if the primary and secondary windings has less interleaving, then more leakage is available through changing the reluctance of the air gap. In any case, less interleaving can result in larger AC winding loss due to the larger magnetic field between windings.

With reference to FIG. 19, Np1 is representative of the number of turns of the primary winding on the left outer post, Np2 is representative of the number of turns of the primary winding on the right outer post. Ns1 is representative of the number of turns of the secondary winding on the left outer post, and Ns2 is representative of the number of turns of the secondary winding is on the right outer post. Given those definitions, then the transformer equation can be calculated as follows:

$$\begin{bmatrix} v_p \\ v_s \end{bmatrix} = \begin{bmatrix} L_{11} & L_{12} \\ L_{21} & L_{22} \end{bmatrix} \begin{bmatrix} i_p \\ i_s \end{bmatrix}, \text{where} \quad (6)$$

$$L_{11} = \frac{R_{g1}(N_{p1}^2 + N_{p2}^2) + R_{g2}(N_{p1}^2 + 2N_{p1}N_{p2} + N_{p2}^2)}{R_{g1}^2 + 2R_{g1}R_{g2}}, \quad (7)$$

$$L_{12} = \frac{R_{g1}(N_{p1}N_{s1} + N_{p2}N_{s2}) + R_{g2}(N_{p1}N_{s1} + N_{p1}N_{s2} + N_{p2}N_{s1} + N_{p2}N_{s2})}{R_{g1}^2 + 2R_{g1}R_{g2}}, \quad (8)$$

$$L_{21} = L_{21}, \text{ and} \quad (9)$$

$$L_{22} = \frac{R_{g1}(N_{s1}^2 + N_{s2}^2) + R_{g2}(N_{s1}^2 + 2N_{s1}N_{s2} + N_{s2}^2)}{R_{g1}^2 + 2R_{g1}R_{g2}}. \quad (10)$$

From the above equations, it can be seen that the more unbalanced the winding distribution (e.g., the less interleaving of the windings), the more leakage by changing the air gap reluctance. So, for different applications, different winding distributions and different air gaps can be selected to meet the required leakage inductance.

Figure 20:
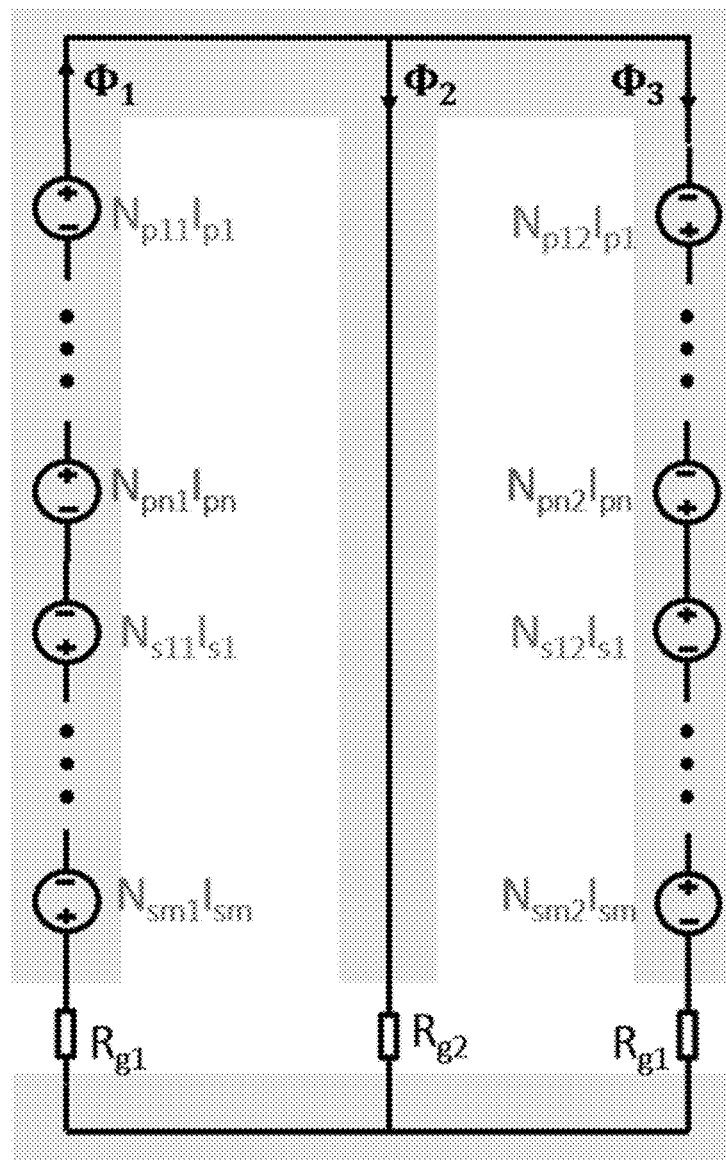
FIG. 20 illustrates an example multi-winding transformer equivalent circuit according to various examples described herein.
Figure 21:
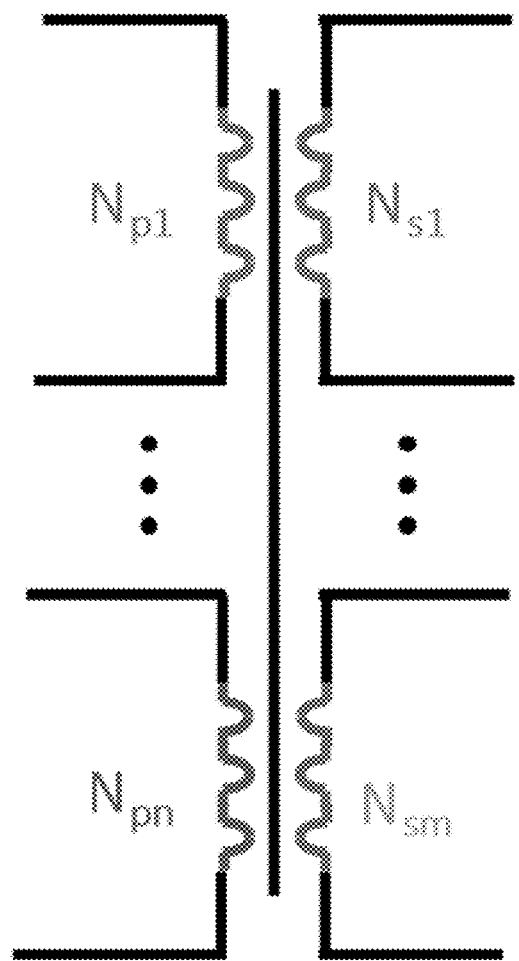
FIG. 21 illustrates an example reluctance model of the multi-winding transformer shown in FIG. 20 with adjustable leakage inductance according to various examples described herein.

The concept can also be extended to a transformer having more than two windings. In that context, FIG. 20 illustrates an example multi-winding transformer equivalent circuit, and FIG. 21 illustrates an example reluctance model of the multi-winding transformer shown in FIG. 20 with adjustable leakage inductance. By changing the winding distribution and air gap reluctance for such a transformer, the leakage inductance for each primary side and secondary side winding can be controlled. Using the reluctance model in FIG. 21, the transformer equation can be given as follows:

$$\begin{bmatrix} v_{p1} \\ \vdots \\ v_{pn} \\ v_{s1} \\ \vdots \\ v_{sm} \end{bmatrix} = \begin{bmatrix} L_{1,1} & \cdots & L_{1,n} & L_{1,n+1} & \cdots & L_{1,n+m} \\ \vdots & \ddots & \vdots & \vdots & \ddots & \vdots \\ L_{n,1} & \cdots & L_{n,n} & L_{n,n+1} & \cdots & L_{n,n+m} \\ L_{n+1,1} & \cdots & L_{n+1,n} & L_{n+1,n+1} & \cdots & L_{n+1,n+m} \\ \vdots & \ddots & \vdots & \vdots & \ddots & \vdots \\ L_{n+m,1} & \cdots & L_{n+m,n} & L_{n+m,n+1} & \cdots & L_{n+m,n+m} \end{bmatrix} \begin{bmatrix} i_{p1} \\ \vdots \\ i_{pn} \\ i_{s1} \\ \vdots \\ i_{sm} \end{bmatrix}. \quad (11)$$

With this transformer equation, the leakage inductance and the magnetizing inductance can be determined.

The components described herein, including the control loops 110, 120, 130, and 140 can be embodied in the form of hardware, firmware, software executable by hardware, or as any combination thereof. If embodied as hardware, the components described herein can be implemented as a collection of discrete analog, digital, or mixed analog and digital circuit components. The hardware can include one or more discrete logic circuits, microprocessors, microcontrollers, or digital signal processors (DSPs), application specific integrated circuits (ASICs), programmable logic devices (e.g., field-programmable gate array (FPGAs)), or complex programmable logic devices (CPLDs)), among other types of processing circuitry.

The microprocessors, microcontrollers, or DSPs, for example, can execute software to perform the control aspects of the embodiments described herein. Any software or program instructions can be embodied in or on any suitable type of non-transitory computer-readable medium for execution. Example computer-readable mediums include any suitable physical (i.e., non-transitory or non-signal) volatile and non-volatile, random and sequential access, read/write and read-only, media, such as hard disk, floppy disk, optical disk, magnetic, semiconductor (e.g., flash, magneto-resistive, etc.), and other memory devices. Further, any component described herein can be implemented and structured in a variety of ways. For example, one or more components can be implemented as a combination of discrete and integrated analog and digital components.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A power converter, comprising:
   a first converter stage configured to convert power from a power source to power at an intermediate link voltage;
   a second converter stage configured to convert the power at the intermediate link voltage to power for charging a battery; and
   a control system comprising:
      an intermediate link voltage regulation control loop configured, in a first mode of operation, to regulate the intermediate link voltage through the first converter stage based on a voltage of the battery; and
      a ripple regulation control loop configured to sense a charging current for the battery and regulate a gain of the second converter stage based on the charging current to reduce ripple in the charging current.

2. The power converter of claim 1, wherein the first converter stage comprises an alternating current (AC) to direct current (DC) converter stage, and the second converter stage comprises a DC to DC converter stage.

3. The power converter of claim 1, wherein the ripple regulation control loop is configured to regulate at least one of a switching frequency, phase shift angle, or duty cycle of switching transistors in second converter stage.

4. The power converter of claim 1, wherein the intermediate link voltage regulation control loop configured, in a second mode of operation, to regulate the intermediate link voltage through the second converter stage based on the voltage of the battery.

5. The power converter of claim 4, wherein the battery is charging in the first mode and discharging in the second mode.

6. The power converter of claim 1, wherein the control system further comprises a critical conduction mode (CRM) power factor correction (PFC) control loop.

7. The power converter of claim 1, wherein the control system further comprises a charging profile control loop configured to provide a current reference input to the ripple regulation control loop based on a charging profile for the battery.

8. The power converter of claim 7, wherein the charging profile for the battery comprises pre-charge, constant current charge, constant power charge, and constant voltage charge stages.

9. The power converter of claim 1, wherein:
   the second converter stage comprises a transformer, the transformer comprising an E-shaped core having an inner post and outer posts, an I-shaped core, a primary winding, and a secondary winding; and
   the primary winding and the secondary winding are interleaved among each other on the outer posts of the E-shaped core.

10. The power converter of claim 9, wherein a number of windings of the primary winding on a first of the outer posts of the E-shaped core is different than a number of windings of the primary winding on a second of the outer posts of the E-shaped core.

11. The power converter of claim 9, wherein an air gap between the I-shaped core and the inner post of the E-shaped core is selected to determine a leakage of the transformer.

12. A power converter, comprising:
   a first converter stage and a second converter stage configured to convert power using an intermediate link voltage; and
   a control system comprising:
      an intermediate link voltage regulation control loop configured to regulate the intermediate link voltage through at least one of the first converter stage or the second converter stage; and
      a ripple regulation control loop configured to regulate a gain of the first converter stage or the second converter stage to reduce ripple in current output by the power converter.

13. The power converter of claim 12, wherein the first converter stage comprises an alternating current (AC) to direct current (DC) converter stage, and the second converter stage comprises a DC to DC converter stage.

14. The power converter of claim 12, wherein the control system further comprises a critical conduction mode (CRM) power factor correction (PFC) control loop.

15. The power converter of claim 12, wherein the control system further comprises a charging profile control loop configured to provide a current reference input to the ripple regulation control loop based on a charging profile for a battery.

16. The power converter of claim 15, wherein the charging profile for the battery comprises pre-charge, constant current charge, constant power charge, and constant voltage charge stages.

17. The power converter of claim 12, wherein:
   at least one of the first converter stage or the second converter stage comprises a transformer, the transformer comprising an E-shaped core having an inner post and outer posts, an I-shaped core, a primary winding, and a secondary winding; and
   the primary winding and the secondary winding are interleaved among each other on the outer posts of the E-shaped core.

18. The power converter of claim 17, wherein a number of windings of the primary winding on a first of the outer posts of the E-shaped core is different than a number of windings of the primary winding on a second of the outer posts of the E-shaped core.

19. The power converter of claim 18, wherein an air gap between the I-shaped core and the inner post of the E-shaped core is selected to determine a leakage of the transformer.

* * * * *

UNITED STATES PATENT AND TRADEMARK OFFICE
CERTIFICATE OF CORRECTION

PATENT NO. : 10,454,381 B2
APPLICATION NO. : 15/693930
DATED : October 22, 2019
INVENTOR(S) : Bin Li et al.

Page 1 of 1

It is certified that error appears in the above-identified patent and that said Letters Patent is hereby corrected as shown below:

In the Specification

Column 1, the following paragraph should be inserted after the "CROSS-REFERENCE TO RELATED APPLICATIONS" paragraph:

--STATEMENT REGARDING FEDERALLY SPONSORED RESEARCH OR DEVELOPMENT
This invention was made with government support under award DE-EE0006834 awarded by the Department of Energy. The government has certain rights in the invention.--

Signed and Sealed this
Tenth Day of November, 2020

Andrei Iancu
*Director of the United States Patent and Trademark Office*